(12) United States Patent
Zhou et al.

(10) Patent No.: US 11,599,254 B2
(45) Date of Patent: Mar. 7, 2023

(54) METHOD FOR QUICKLY INVOKING SMALL WINDOW WHEN VIDEO IS DISPLAYED IN FULL SCREEN, GRAPHIC USER INTERFACE, AND TERMINAL

(71) Applicant: HUAWEI TECHNOLOGIES CO., LTD., Guangdong (CN)

(72) Inventors: Liang Zhou, Wuhan (CN); Ping Wen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/274,885

(22) PCT Filed: Sep. 10, 2019

(86) PCT No.: PCT/CN2019/105008
§ 371 (c)(1),
(2) Date: Mar. 10, 2021

(87) PCT Pub. No.: WO2020/052529
PCT Pub. Date: Mar. 19, 2020

(65) Prior Publication Data
US 2022/0050582 A1    Feb. 17, 2022

(30) Foreign Application Priority Data

Sep. 10, 2018   (CN) .......................... 201811050640.8

(51) Int. Cl.
*G06F 3/04817* (2022.01)
*G06F 3/04845* (2022.01)
(Continued)

(52) U.S. Cl.
CPC ...... *G06F 3/04845* (2013.01); *G06F 3/04817* (2013.01); *G06F 3/04883* (2013.01);
(Continued)

(58) Field of Classification Search
None
See application file for complete search history.

(56) References Cited

U.S. PATENT DOCUMENTS

2013/0300684 A1* 11/2013 Kim ...................... G06F 3/0488
345/173
2014/0229888 A1*  8/2014 Ko ...................... G06F 3/04886
715/783
(Continued)

FOREIGN PATENT DOCUMENTS

CN        102301736 A     12/2011
CN        103150095 A      6/2013
(Continued)

OTHER PUBLICATIONS

CN108415752A (English Machine Translation) Publihsed on Aug. 17, 2018.*

(Continued)

*Primary Examiner* — Rinna Yi

(57) ABSTRACT

A method for quickly invoking a small window while a video is being displayed in full screen, a graphic user interface, and a terminal are provided. The method may include: When a terminal displays a video playing interface in full screen, the terminal may display a small window in a hover box based on a user operation. A display interface of the small window may be switched. The terminal may further quickly switch between multi-window display and full-screen display based on a user operation. In this process, the terminal continuously plays the video. According to this method, the terminal can quickly switch between multi-window display and full-screen display while continuously playing a video.

21 Claims, 30 Drawing Sheets

(51) Int. Cl.
*G06F 3/04883* (2022.01)
*H04L 51/52* (2022.01)

(52) U.S. Cl.
CPC .... *H04L 51/52* (2022.05); *G06F 2203/04803* (2013.01); *G06F 2203/04808* (2013.01)

(56) References Cited

U.S. PATENT DOCUMENTS

| | | | | |
|---|---|---|---|---|
| 2014/0325438 | A1* | 10/2014 | Choi | G06F 3/0486 715/808 |
| 2015/0121229 | A1 | 4/2015 | Wang et al. | |
| 2015/0185980 | A1* | 7/2015 | An | H04M 1/72403 715/803 |
| 2016/0154536 | A1* | 6/2016 | Kim | G06F 3/04883 715/768 |
| 2016/0202852 | A1* | 7/2016 | Park | G06F 3/04842 715/781 |
| 2017/0115876 | A1* | 4/2017 | Lee | G06F 3/044 |
| 2018/0121027 | A1 | 5/2018 | Kim et al. | |
| 2019/0272064 | A1* | 9/2019 | Ghassabian | G06F 3/011 |

FOREIGN PATENT DOCUMENTS

| | | |
|---|---|---|
| CN | 103475784 A | 12/2013 |
| CN | 105453023 A | 3/2016 |
| CN | 106527900 A | 3/2017 |
| CN | 106681584 A | 5/2017 |
| CN | 106843879 A | 6/2017 |
| CN | 106909268 A | 6/2017 |
| CN | 107908351 A | 4/2018 |
| CN | 108089786 A | 5/2018 |
| CN | 108415752 A | 8/2018 |
| CN | 108415753 A | 8/2018 |
| CN | 109445572 A | 3/2019 |
| EP | 2587369 A1 | 5/2013 |
| WO | 2015016628 A1 | 2/2015 |

OTHER PUBLICATIONS

ITU-T H.264 (Apr. 2017), Series H: Audiovisual and Multimedia Systems, Infrastructure of audiovisual services—Coding of moving video, Advanced video coding for generic audiovisual services, total 812 pages.
International Search Report and Written Opinion issued in PCT/CN2019/105008, dated Nov. 28, 2019, 11 pages.
Extended European Search Report issued in EP 19859269.3, dated Aug. 19, 2021, 11 pages.
Office Action issued in CN 201811050640.8, dated Jan. 28, 2021, 12 pages.
Office Action issued in CN 201811050640.8, dated Aug. 10, 2021, 13 pages.
Office Action issued in CN201811050640.8, dated Oct. 27, 2022, 12 pages.

* cited by examiner

METHOD FOR QUICKLY INVOKING SMALL WINDOW WHEN VIDEO IS DISPLAYED IN FULL SCREEN, GRAPHIC USER INTERFACE, AND TERMINAL

CROSS-REFERENCE TO RELATED APPLICATIONS

This application is a National Stage of International Patent Application No. PCT/CN2019/105008 filed on Sep. 10, 2019, which claims priority to Chinese Patent Application No. 201811050640.8, filed on Sep. 10, 2018, both of which are incorporated herein by reference in their entities.

TECHNICAL FIELD

This application relates to the field of man-machine interaction technologies, and in particular, to a method for quickly invoking a small window when a video is being displayed in full screen, a graphic user interface, and a terminal.

BACKGROUND

Currently, a terminal device may simultaneously run a plurality of applications in the background, and a user may switch between different applications as needed, to enter an interface on which the user wants to perform an operation.

To pursue better use experience, the user expects that contents from interfaces of different applications are simultaneously presented on a display of the terminal device, and different interface contents do not affect each other. For example, when watching a video, the user wants to view instant messaging information (for example, a Facebook message, a WeChat message, or a QQ message) at the same time, and the video is not interrupted.

Based on the current urgent need of the user for presenting a plurality of windows on a same display, it is necessary to propose a corresponding technical solution, to conveniently and quickly present a plurality of windows on a display of a terminal device simultaneously.

SUMMARY

Example embodiments of this application provide a method for quickly invoking a small window when a video is displayed in a full screen, a graphical user interface, and a terminal, to quickly switch between displaying a video in a full screen and displaying a plurality of windows, without affecting playing of a video.

According to a first aspect of an embodiment, this application provides a method for quickly invoking a small window when a video is displayed in full screen. The method is applied to a terminal, and the method may include: displaying, by a terminal, a video playing interface in full screen; displaying, by the terminal, a first window in a hover box when detecting an input first user operation, where the first window includes a first interface; switching, by the terminal, from the first interface to a second interface when detecting an input second user operation; stopping, by the terminal, displaying the first window when detecting an input third user operation; and displaying, by the terminal, the first window in the hover box when detecting an input fourth user operation, where the first window includes the second interface, the terminal continuously displays the video playing interface, and the video is continuously played.

According to the method in the first aspect, when a user watches the video in full screen, the user can quickly switch between displaying the video in full screen and displaying a plurality of windows, without affecting playing of the video.

With reference to the first aspect, the first user operation may be a gesture made on a display of the terminal, or may be a voice instruction, an eyeball rotation operation, or the like.

In some embodiments, the first user operation may be a gesture of sliding a knuckle of a user on the display of the terminal to draw a first graph. The first graph may be a rectangle, a triangle, a square, a circle, or the like. The first graph drawn by the user on the display by using the knuckle may not be a standard shape in a geometric sense, but only needs to be similar to the standard shape. Herein, the terminal may determine, based on different signals generated when different finger parts are in contact with the display, whether the user draws the first graph by sliding the knuckle on the display of the terminal.

In some embodiments, the first user operation may be a tap operation of a finger of the user on the display of the terminal. Further, a system of the terminal may further determine, with reference to a frequency of the tap operation, whether to display the first window. For example, when the system of the terminal detects that the user single-taps, double-taps, or triple-taps the display, the terminal displays the first window. Further, the system of the terminal may further determine, with reference to an area in which the tap operation is performed, whether to trigger the terminal to display the first window. For example, when the system of the terminal detects that the user performs the tap operation in a preset area on the display, the terminal displays the first window.

In some embodiments, the first user operation may be that the finger of the user is in a first floating posture above the display. The first floating posture may mean that a finger floated above the display is in a straight state, a bent state, or the like.

In some embodiments, the first user operation is not limited to a default setting of the terminal at delivery, or may be set by the user. Specifically, the user may select, from a setting menu that includes a plurality of user operations, a user operation as the first user operation, or the user may customize the first user operation based on a habit of the user.

With reference to the first aspect, the terminal displays the first window in the hover box when detecting the first user operation. In a possible implementation, displaying the first window in the hover box may be: simultaneously displaying the video playing interface and the first window on the display of the terminal, where the first window is stacked on the video playing interface. In another possible implementation, displaying the first window in the hover box means that when the terminal displays the video playing interface, an area in which the first window is located is not used to display the video playing interface, but is used to display the first window.

With reference to the first aspect, when the terminal detects the first user operation, a shape, a position, and a size of the first window displayed in the hover box may be set by the system of the terminal by default, or may be related to the first user operation.

With reference to the first aspect, the first window displayed in the hover box when the terminal detects the first user operation includes the first interface. In some embodiments, the first interface may include any one of: (1) an icon of an application; (2) a thumbnail of an application; or (3) an interface of an instant messaging application.

With reference to the first aspect, the second user operation may be a gesture performed on the first interface. In response to the input second user operation, the first interface of the first window is switched to the second interface. Herein, the first interface and the second interface may be the same, or may be different. This is not limited in embodiments of this application.

In some embodiments of this application, the second user operation is set by the user, or the second user operation is set by the terminal.

In some embodiments, when the first interface includes the icon of the application, the second user operation may be a tap operation performed by the user on the icon of the application, and the second interface may be the interface of the instant messaging application.

In some embodiments, when the first interface includes the thumbnail of the application, the second user operation may further be a tap operation performed by the user on thumbnail of the application, and the second interface may be the interface of the instant messaging application.

In some embodiments, when the first interface includes the interface of the instant messaging application, the second user operation may further be a tap operation performed on an option or a control included on the interface of the instant messaging application, and the second interface may be another interface of the instant messaging application.

With reference to the first aspect, the third user operation may be performed on the display of the terminal.

In some embodiments, the third user operation may be a gesture of sliding two fingers of the user from the first window to an edging area of the display. Herein, the terminal may determine, based on a quantity of touch points at which the user touches the display, whether the user enters a two-finger slide gesture.

In some embodiments, the third user operation may alternatively be that the user uses two fingers to separately touch different positions in the first window and slide inwards and towards a central area of the first window; or may be a tap operation performed on the video playing interface, to be specific, the user transfers, from the first window to the video playing interface, a focus at which the user touches the display by using a finger.

In some embodiments, the third user operation may alternatively be a tap operation performed by the user on a close control in the first window.

In some embodiments of this application, the third user operation is set by the user, or the third user operation is set by the terminal.

In some embodiments of this application, stopping displaying the first window means that a corresponding program that triggers multi-window display is disabled, and the display of the terminal displays only the video playing interface. Stopping displaying the first window may include the following two cases: hiding the first window, and closing the first window. The hidden first window may continue to run in the background of the terminal. After the first window is closed, a processing resource, a storage resource, and the like that are used by the terminal to display the small window may be released.

In a possible implementation, after stopping displaying the first window, the terminal displays a prompt identifier of the first window. The prompt identifier may be a graphic identifier (for example, a prompt bar, a small window icon, or an arrow), a text, or the like. Herein, after displaying of the first window is stopped, when an interface of the first window is updated, the terminal may change a display status of the graphic identifier, to prompt the user. Changing the display status of the graphic identifier may include displaying the graphic identifier in a shaking manner or in a highlighted manner.

With reference to the first aspect, the fourth user operation may be performed on the display of the terminal. In some embodiments, the fourth user operation may be a gesture of sliding two fingers of the user from an edging area of the display to a middle area. Further, the terminal may further determine, with reference to a detected speed of sliding the two fingers of the user and a detected track length, whether to display the first window. For example, when the speed of sliding the two fingers of the user is greater than a first value, or the track length of sliding the two fingers of the user is greater than a second value, the terminal displays the first window.

In some embodiments of this application, the fourth user operation is set by the user, or the fourth user operation is set by the terminal.

In the method in the first aspect, the first window displayed by the terminal in the hover box in response to the fourth user operation includes the second interface. In other words, content displayed in the first window is the same as content displayed when the terminal stops displaying the first window in response to the third user operation. Herein, the user may re-invoke, through the fourth user operation, the first window having a same interface, to facilitate a user operation and improve user experience.

In some embodiments, after detecting the input fourth user operation, the terminal may further detect whether an application having the first window is running. When detecting that the application having the first window is running, the terminal displays the first window in the hover box in response to the fourth user operation.

With reference to the first aspect, in some embodiments, the method further includes: when detecting an input fifth user operation, adjusting, by the terminal, the display status of the first window based on the fifth user operation, where the display status of the first window includes at least one of: a position, a size, or a shape.

With reference to the first aspect, in some embodiments, the method further includes: switching, by the terminal, the video playing interface and a display interface of the first window when detecting an input sixth user operation. Herein, the terminal may display a switching icon, and the sixth user operation may be a tap operation performed on the switching icon. The sixth user operation may alternatively be a gesture in which the user uses two fingers to separately touch the first window and the video playing interface and slide towards a middle area. The sixth user operation may alternatively be a gesture in which the user uses a single finger to touch any position in the first window and slide from the first window to the video playing interface.

In a process of implementing the method in the first aspect, the terminal continuously displays the video playing interface, and the video is continuously played. In other words, in some embodiments of this application, the small window may be displayed when the video is continuously played.

According to a second aspect of an embodiment, this application provides a graphical user interface on a terminal. The terminal has a display, a memory, and one or more processors configured to execute one or more programs stored in the memory, and the graphical user interface includes a video playing interface that is currently output by a system and that is displayed on the display in full screen. The following operations are performed:

displaying a first window in a hover box in response to a first user operation detected by the terminal, where the first window includes a first interface;

switching the first interface to a second interface in response to a second user operation detected by the terminal;

stopping displaying the first window in response to an input third user operation detected by the terminal; and displaying the first window in the hover box in response to an input fourth user operation detected by the terminal, where the first window includes the second interface; and the graphical user interface includes the video playing interface, and the video is continuously played.

With reference to the second aspect, in some embodiments, the graphical user interface further includes: adjusting, by the terminal, the display status of the first window in response to an input fifth user operation detected by the terminal, where the display status of the first window includes at least one of: a position, a size, or a shape.

With reference to the first aspect, in some embodiments, the graphical user interface further includes: switching, by the terminal, the video playing interface and a display interface of the first window in response to an input sixth user operation detected by the terminal.

In the graphical user interface provided in the second aspect, for descriptions of the first user operation, the second user operation, the third user operation, the fourth user operation, the fifth user operation, and the sixth user operation, refer to related content in the first aspect. Details are not described herein again.

According to a third aspect of an embodiment, this application provides a terminal, including one or more processors and one or more memories. The one or more memories are coupled to the one or more processors, the one or more memories are configured to store computer program code, the computer program code includes a computer instruction, and when the one or more processors execute the computer instruction, the terminal performs the method for quickly invoking a small window when a video is displayed in full screen according to the first aspect.

According to a fourth aspect of an embodiment, this application provides a computer storage medium, including a computer instruction. When the computer instruction is run on a terminal, the terminal is enabled to perform the method for quickly invoking a small window when a video is displayed in full screen according to the first aspect.

According to an embodiment of this application, when displaying the video playing interface in full screen, the terminal may display the small window in the hover box based on a user operation, and a display interface of the small window may be switched. The terminal may further quickly switch between multi-window display and full-screen display based on the user operation. In this process, the terminal continuously plays the video.

BRIEF DESCRIPTION OF DRAWINGS

To describe the technical solutions in the embodiments of this application more clearly, the following briefly describes the accompanying drawings of which.

DESCRIPTION OF EMBODIMENTS

The following describes technical solutions in embodiments of this application with reference to accompanying drawings in the embodiments of this application.

In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the quantity of indicated technical features. Therefore, a feature limited by "first" or "second" may explicitly or implicitly include one or more features. In the description of the embodiment of this application, unless otherwise stated, "a plurality of" means two or more than two.

According to an example method for quickly invoking a small window provided in this application, a plurality of windows can be displayed on a display of a terminal.

First, an example application scenario is used as an example to describe the method for quickly invoking a small window in this application. In the application scenario, while watching a video, a user wants to view instant messaging information (for example, a WeChat message or a Facebook message) at the same time, and wants to keep a video window being displayed.

The following provides descriptions by using an example in which the user is watching the video in full screen. The video may be a video provided by a video application or a portal website, or may be a video stored in a terminal 100, or may be a video received by the terminal 100 from another device. This is not limited herein. The video interface may display a video that is being played, or may display a paused video.

Figure 1:
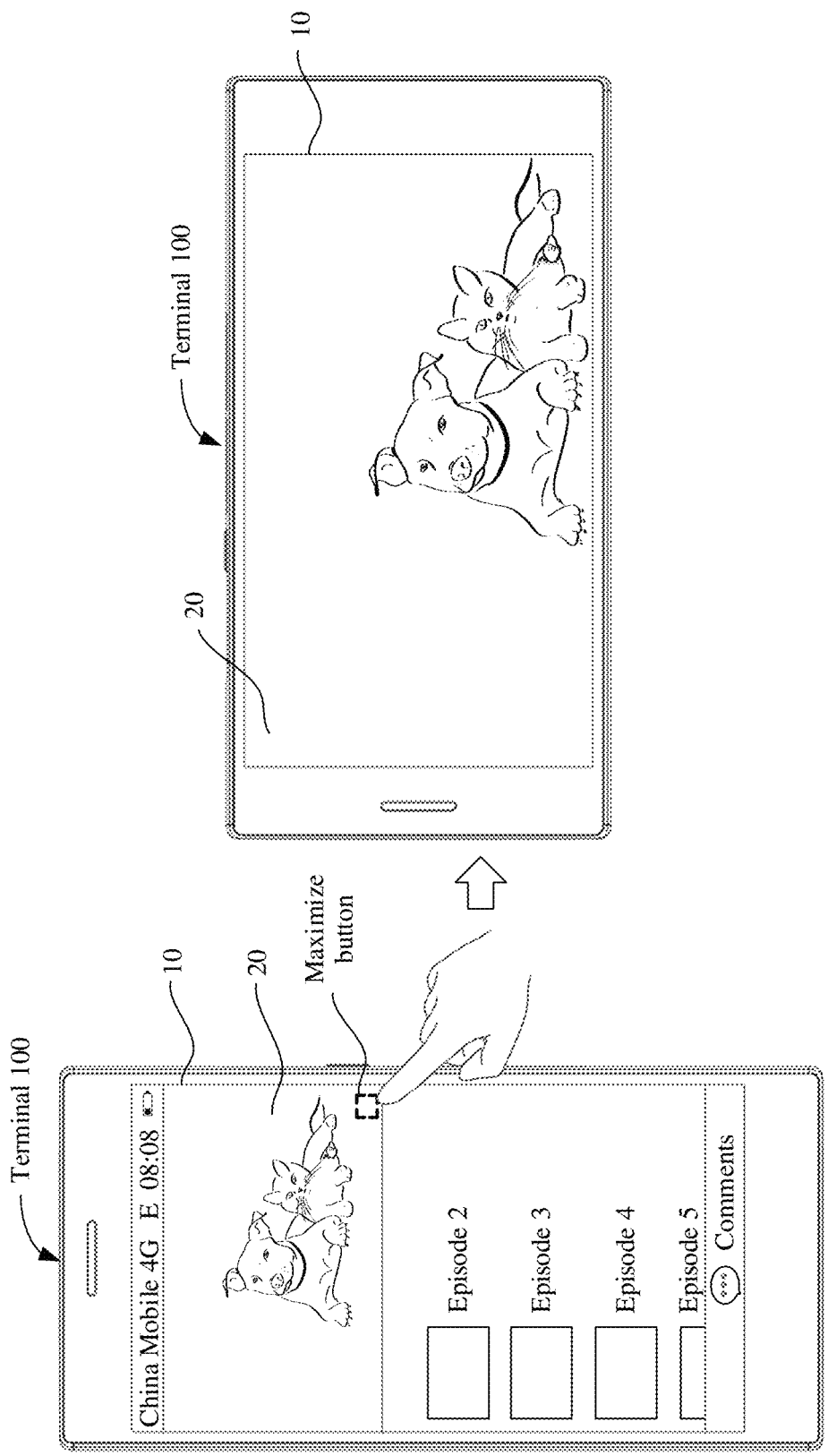
FIGS. 1, 2, 3, 4, 5, 6a, 6b, 7, 8, 9a, 9b, 9d, 9c, 9d, 10a, 10b, 10c, 10d, 10e, 11a, 11b, 11c, 11d, 12, 13a, 13b, 13c, 14a, 14b, 15a, 15b, 16a, 16b, 17a, 17b, 18a, 18b, 19a, 19b, and 20 are schematic diagrams of non-limiting, example man-machine interaction embodiments.

For example, as shown in a left portion of FIG. 1, a display 10 of the terminal 100 displays interface content 20 currently output by a system, and the interface content 20 is on an interface provided by the video application. In some embodiments of this application, a touch panel is disposed on the display 10, and may be configured to receive a touch control operation performed by the user. The touch control operation is an operation that the user touches the display 10 by using a hand, an elbow, a stylus, or the like. When the terminal 100 detects an operation (for example, tapping a maximize button) performed by the user on the video interface, or when a posture of the terminal 100 changes from portrait orientation to landscape orientation, in response to the operation, the terminal 100 displays, in full screen, a video interface shown in a right portion of FIG. 1.

In some embodiments of this application, displaying the video interface in full screen means that the display 10 displays only the video interface and does not display other content. In a possible implementation, when displaying the video interface in full screen, the video interface may occupy an entire display area of the display 10, as shown in the right portion of FIG. 1. In another possible implementation, the video interface may alternatively occupy only a part of a display area of the display 10. For example, when the display 10 is a notch screen, the video interface is displayed in the middle of the notch screen, and an edge on one side or edges on both sides of the video interface are displayed in black, it may also be considered that the display 10 displays the video interface in full screen.

In some other embodiments of this application, displaying the video interface in full screen may mean that when displaying the video interface, the display may further display a system-level interface element, for example, a status bar or a floating shortcut menu (for example, Assistive Touch of Apple). The status bar may include a name of an operator (for example, China Mobile), a time, a Wi-Fi icon, signal strength, current remaining battery power, and the like.

Herein, the video interface may include a video picture, and may further include a progress bar of the video, a virtual button for adjusting volume, a virtual button for playing/pausing a video, and the like.

When the user watches the video interface of the interface content 20, if the user wants to view the WeChat message at the same time, the user may draw a rectangle 40 by sliding a knuckle on the interface content 20 displayed on the display 10. In response to an operation of drawing the rectangle 40 by using the knuckle of the user, the terminal 100 displays a small window 30 in a hover box when displaying the interface content 20 on the display 10. In this specification, for brevity of description, that the terminal 100 displays the small window 30 subsequently means that the terminal 100 displays the small window 30 in the hover box when displaying the interface content 20 on the display 10.

Figure 2:
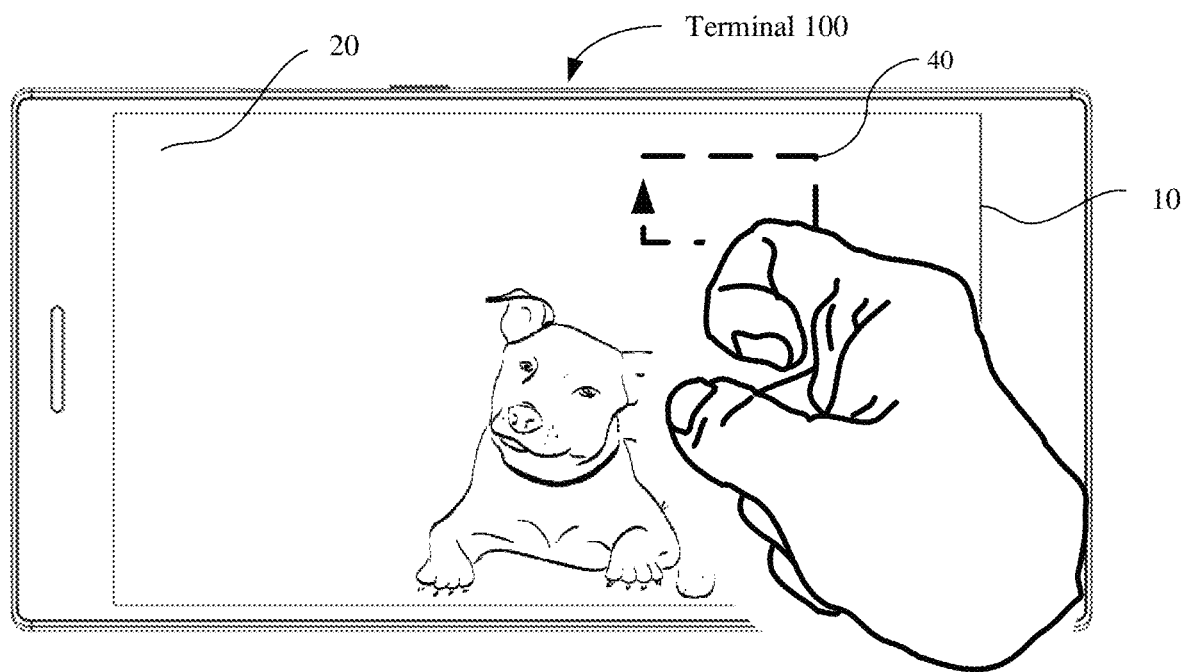

For example, as shown in FIG. 2, the user may draw the rectangle 40 on the display 10 by sliding a knuckle of an index finger, to trigger the terminal 100 to display the small window 30 on the display 10. In this application, a user operation that triggers the terminal 100 to display the small window 30 on the display 10 may be referred to as a first user operation.

Herein, the knuckle may be a back side of a finger that surrounds any area of the knuckle. In addition to the knuckle of the index finger of a right hand shown in FIG. 2, the user may further draw the rectangle 40 on the display 10 by using one or more other knuckles, for example, a knuckle of a middle finger of a left hand, or a knuckle of a ring finger of the right hand. The user may draw the rectangle 40 in any position on the display 10 by using the knuckle, or may draw the rectangle 40 in a preset position. This is not limited in embodiments of this application.

Herein, the rectangle 40 drawn by the user on the display 10 by using the knuckle may not be a standard shape in a geometric sense, and a specific error between the rectangle 40 drawn by the user and the standard rectangle in the geometric sense is allowed, provided that the rectangle 40 is similar to the standard rectangle.

In a specific implementation, when different finger parts such as a finger pad, a fingertip, and a knuckle are in contact with the display of the terminal, different vibration and/or acoustic effects may be generated, and a corresponding signal (including a pressure value generated by the contact operation on the display, a capacitance value, an acceleration value generated for the terminal, and the like) is generated. The signals generated by the different finger parts may be captured by a sensor (for example, a capacitive pressure sensor, an acceleration sensor, an impact sensor, a vibration sensor, an acoustic sensor, a displacement sensor, or a speed sensor) of the terminal. Therefore, the terminal may distinguish, by using the captured signals, a finger part used by the user to touch the display. Further, the terminal may detect coordinates of a real-time touch point at which the knuckle of the user touches the display in a sliding process, and determine, based on a change in a position of the touch point in the sliding process, whether the knuckle of the user currently slides to draw the rectangle 40, so as to identify an input user operation.

In some embodiments of this application, when watching the video, the user may control a video progress, volume, and the like by sliding a part such as a finger pad or a fingertip on the video interface, or may open the small window 30 by drawing the rectangle 40 by using the knuckle in the embodiment shown in FIG. 2. That is, the user may implement different control functions by using the part such as the finger pad or the knuckle.

Figure 3:
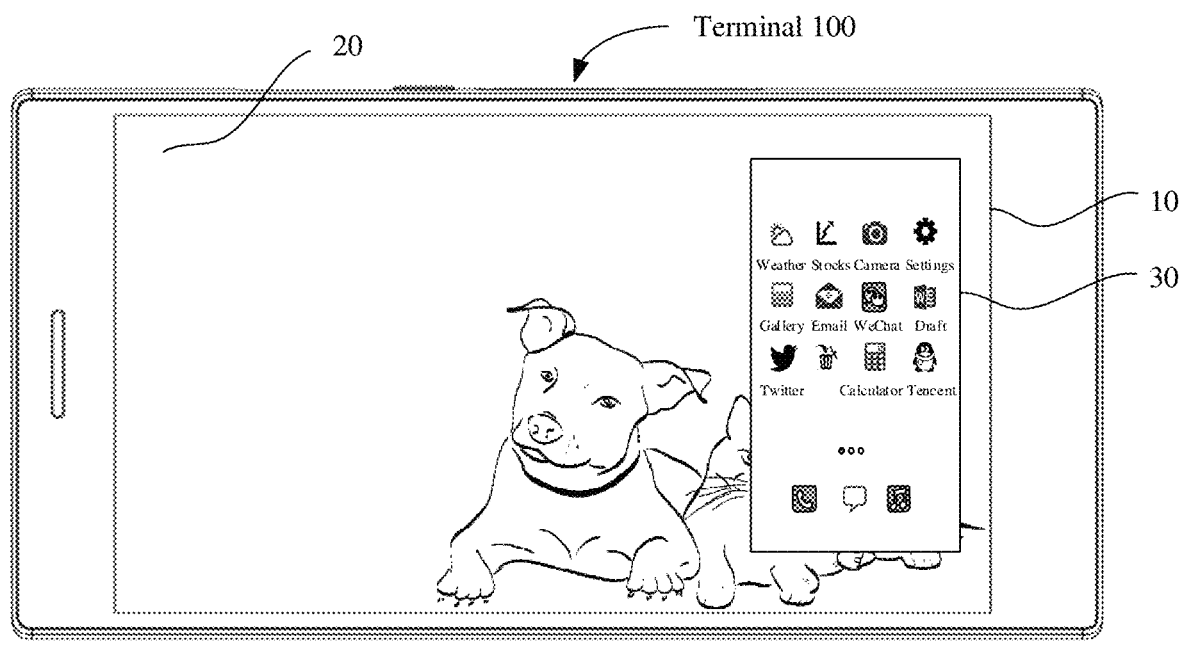

For example, as shown in FIG. 3, in response to the operation of drawing the rectangle 40 by using the knuckle of the user, the terminal 100 displays the small window 30 in the hover box on the display 10.

In a possible implementation, displaying the small window 30 in the hover box means that the display 10 simultaneously displays the interface content 20 and the small window 30, and the small window 30 is stacked on the interface content 20. Herein, when the display 10 displays the interface content 20 and the small window 30 in a stacked manner, the small window 30 may be transparent. To be specific, the user may see partial content in the interface content 20 in an area of the small window 30. The small window 30 may alternatively be opaque. To be specific, the user cannot see content in the interface content 20 in the area of the small window 30. This is not limited herein.

In another possible implementation, displaying the small window 30 in the hover box means that when the display 10 displays the interface content 20, an area in which the small window 30 is located on the display 10 is not used to display the interface content 20, but is used to display the small window 30.

In the embodiment shown in FIG. 3, the small window 30 is a rectangle. When the terminal 100 is a tablet device (for example, a tablet computer provided with an eight-inch display or a nine-inch display), a palmtop computer, or the like, a size of the rectangular small window 30 may be similar to a size of a display of a mobile phone (for example, 4.8 inches or 5.5 inches), to help the user to view the content in the small window 30. In addition, in the embodiment in FIG. 2, because both a drawn track and the small window are rectangles, the user may vividly remember a manner of opening the small window 30.

In some embodiments of this application, the small window 30 may display one or more icons of applications. For example, as shown in FIG. 3, the small window 30 may display a desktop used to display an icon of an application installed on the terminal. In some optional embodiments, the desktop may further include a system-level interface element (for example, a signal bar or a floating shortcut menu (for example, an Assistive Touch of Apple)).

In the embodiment shown in FIG. 3, the desktop displayed by the small window 30 is similar to a desktop displayed by the terminal in full screen, and may be configured to: receive a user operation, and output a corresponding interface based on the received user operation. For example, the user may slide left or right in the small window 30 to switch between different pages displayed on the desktop. For another example, the user may tap any icon of an application in the small window 30 to enter the application. In this application, an operation used to switch an interface displayed in the small window 30 may be referred to as a second user operation.

Herein, in addition to the desktop shown in FIG. 3, the icon that is of the application and that is displayed in the small window 30 may also be any one of: (1) an icon of an application that has been opened in the terminal 100 in a recent period of time (for example, one hour or one day); (2) an icon that is of an application and that is preset by the user, where for example, if the user often views instant messaging information when watching a video, the user may specify that an icon of an instant messaging application (for example, WeChat, QQ, or Facebook) is displayed in the small window 30; or (3) an icon that is an application and that is specified by the terminal based on a habit of the user, where for example, the terminal may record and learn of an operation habit of the user, and if the user often opens WeChat in the small window 30, the terminal may automatically specify that a WeChat icon is displayed in the small window 30.

Figure 4:
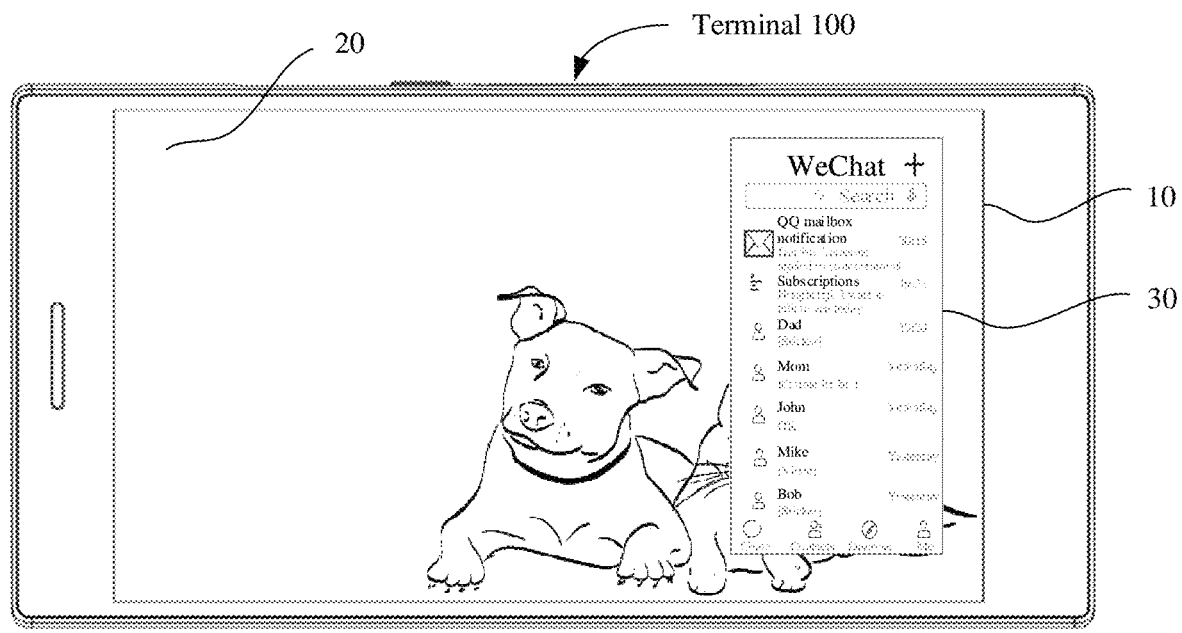

After the terminal 100 displays the small window 30 on the display 10, the user may tap the WeChat icon to enter a display interface of WeChat. For example, as shown in FIG. 4, in response to a tap operation performed by the user on the WeChat icon, the small window 30 may enter the display interface of WeChat. Similar to a case in which the terminal 100 enters the display interface of WeChat in full screen, the user may also view a WeChat message, send/reply a WeChat message, view Moments, publish Moments, and the like on the display interface of WeChat in the small window 30.

In a possible implementation, when the terminal 100 detects the operation of drawing the rectangle by using the knuckle of the user, the terminal 100 may scale down interface content 20 when displaying the small window 30 on the display 10. Herein, the interface content may be scaled down according to a preset proportion, or the interface content 20 may be scaled down according to a display position of the small window 30. The interface content 20 is scaled down, to prevent some content in the interface content 20 from being blocked or covered by the small window 30, and provide the user with better visual experience.

In the foregoing application scenario, from a moment at which the user draws the rectangle by using the knuckle to a moment at which the terminal 100 displays the small window 30 on the display 10, a video playing interface in the interface content 20 may be interrupted or may not be interrupted. When the video is not interrupted, the user can view the WeChat messages when watching the video.

Figure 5:
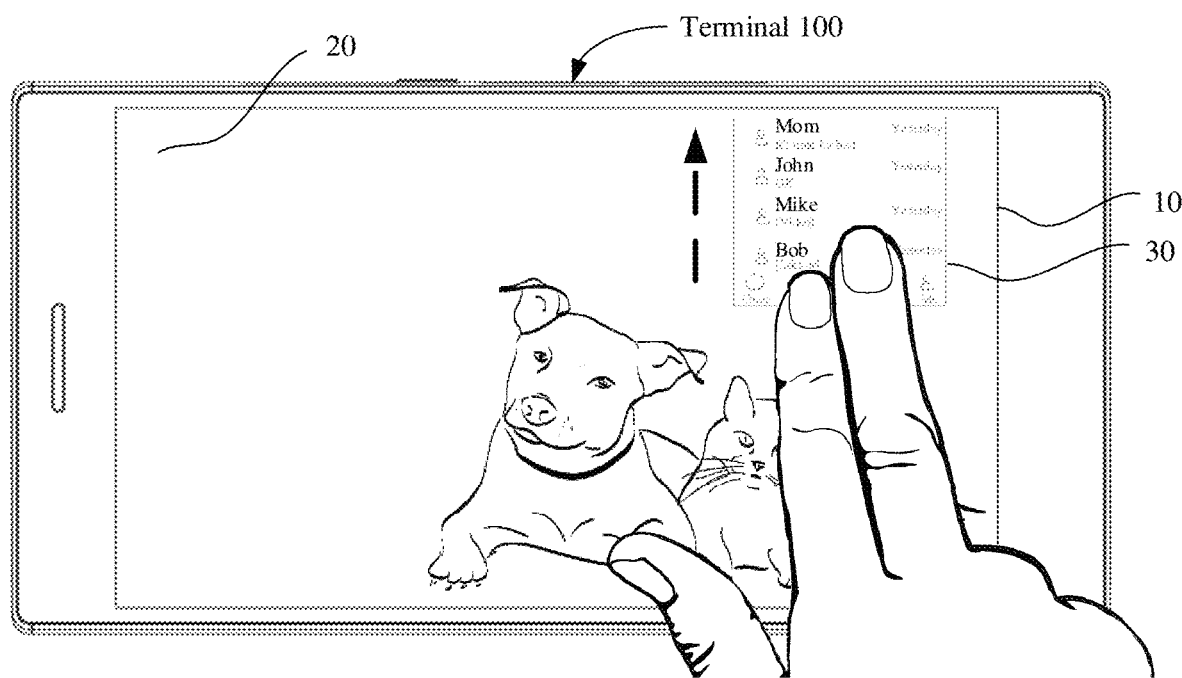

After viewing the WeChat message in the small window 30, the user may want to watch the video better, and expect that the interface content 20 is not blocked. In this case, the small window 30 needs to be hidden. For example, as shown in FIG. 5, the user may hide the small window 30 by using a gesture of sliding two fingers from the small window 30 to an upper edging area of the display 10. In response to an operation that is of sliding two fingers of the user upward and that is detected by the terminal 100, the terminal 100 hides the small window 30. To be specific, the small window 30 runs in the background, and the display 10 displays only the interface content 20 shown in the right portion of FIG. 1. In other words, the display 10 displays the video playing interface in full screen. In this application, an operation used to hide the small window 30 may be referred to as a third user operation.

In addition to the gesture of sliding two fingers to the upper edging area of the display, the user may also hide the small window 30 by using a gesture of sliding two fingers to a lower edging area of the display 10, a right edging area of the display 10, a lower left edging area of the display 10, or the like. Herein, the sliding gesture may start from any position in the small window 30, and end at an edging area of the display 10 or an area that is in the terminal 100 and that does not belong to the display 10.

In a possible implementation, after the user hides the small window 30 by using a gesture, the small window 30 will be hidden (in other words, the small window 30 is running in the background). Herein, the terminal 100 may display a graphic identifier (for example, a prompt bar, a small window icon, or an arrow), a text, or the like on the display 10, to indicate to the user that the small window 30 is hidden. A display position of the graphic identifier, the text, or the like on the display 10 may be related to a position in which the small window 30 is hidden, or may be displayed in a preset area, for example, an upper right part of the display 10.

Figure 6A:
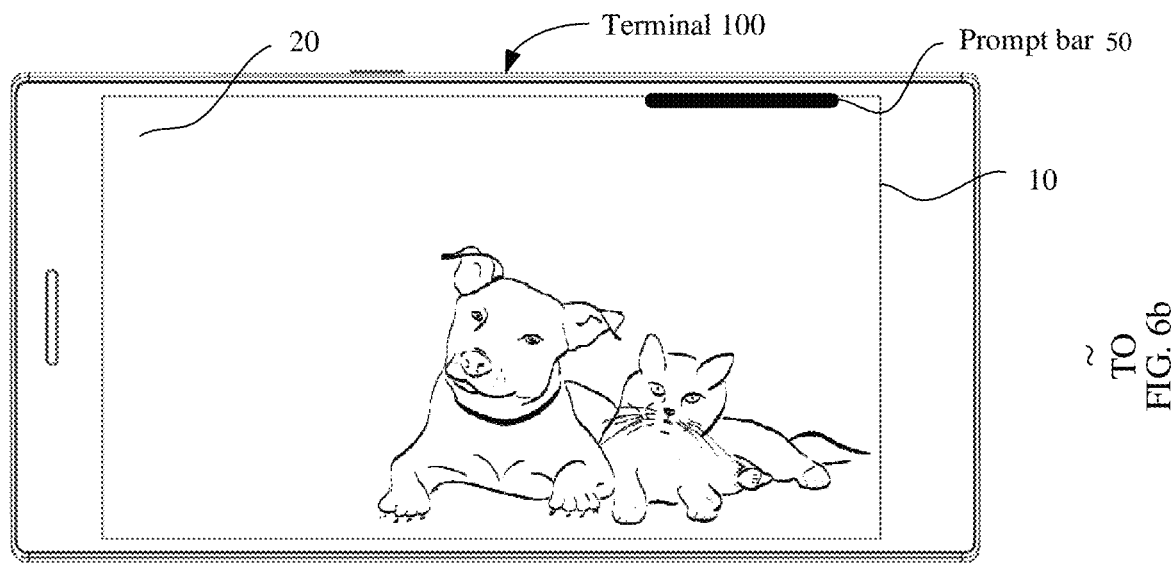
Figure 6B:
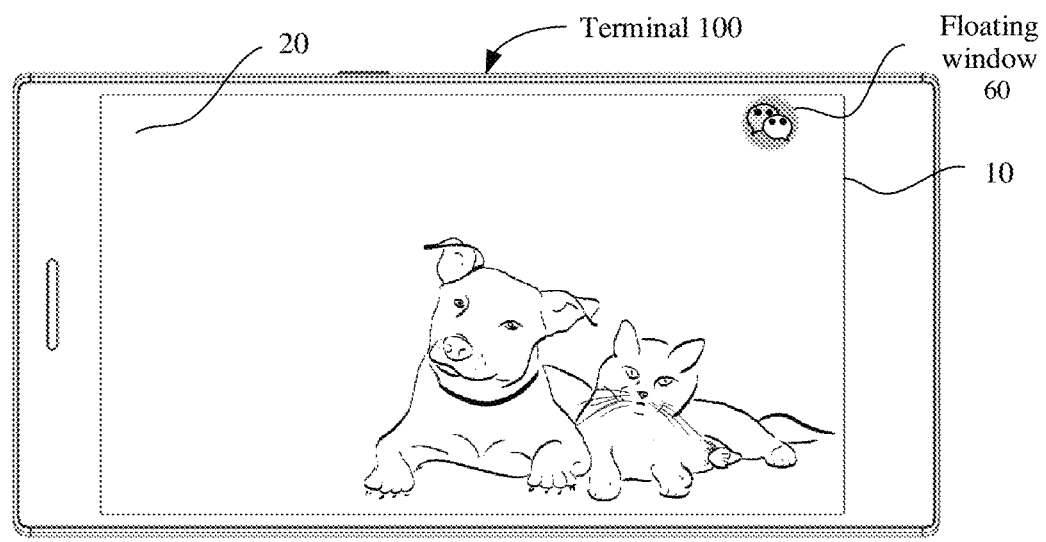

For example, as shown in FIG. 6a, a black prompt bar 50 may be displayed on the upper right part of the display. For example, as shown in FIG. 6b, when the small window 30 is hidden and a WeChat interface is displayed, a circular floating window of WeChat may be displayed on the upper right part of the display, to prompt the user with the fact that the small window 30 is hidden.

In a possible implementation, after the terminal 100 prompts, on the display 10, the user with a fact that the small window 30 is hidden, if a display interface of the small window 30 running in the background is updated, the terminal 100 may further prompt the user with a fact that the display interface of the small window 30 is updated. Herein, the terminal 100 may prompt the user in a plurality of manners. For example, the terminal 100 displays, on the display 10 in a shaking manner, the prompt bar 50 shown in FIG. 6a or the circular floating window 60 shown in FIG. 6b, or displays, in a highlighted manner, the prompt bar 50 shown in FIG. 6a or the circular floating window 60 shown in FIG. 6b, a blinking signal light, a voice prompt, or the like. This is not limited in embodiments of this application. Herein, that the display interface of the small window 30 is updated may include but is not limited to the following cases: an interface of the instant messaging application is displayed when the small window 30 is hidden, and the instant messaging application receives a new message after the small window 30 is hidden.

Figure 7:
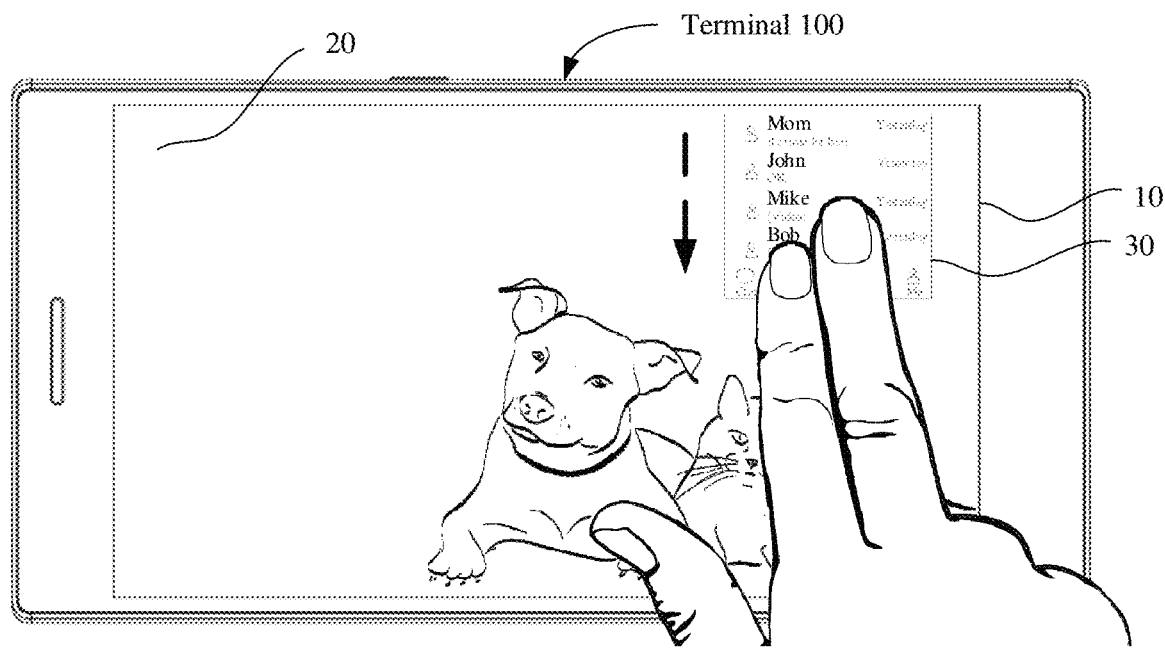

In the embodiment shown in FIG. 5, after the user hides the small window 30 by using a gesture, if the user wants to view a WeChat message again in a process of watching the video, the user may re-invoke the small window 30. For example, as shown in FIG. 7, the user may invoke the small window 30 by using a gesture of sliding two fingers from the upper edging area of the display 10 to an internal part of the display 10. In response to an operation that is of sliding two fingers of the user downward and that is detected by the terminal 100, the terminal 100 re-invokes the small window 30. In other words, the small window 30 is re-displayed on the display 10. In this application, an operation used to re-invoke the small window 30 may be referred to as a fourth user operation.

In a specific implementation, when receiving a gesture of sliding two fingers downward shown in FIG. 7, the terminal detects whether the small window is running in the background. If the small window is running in the background, the small window 30 is re-invoked in response to the gesture of sliding two fingers downward. Herein, the terminal may detect whether a corresponding program that triggers multi-window display is running in an application task stack. If the corresponding program that triggers multi-window display is running in the application task stack, it indicates that the small window is running in the background.

In a possible implementation, after the small window 30 is hidden, when the display 10 displays prompt information prompting the user with a fact that the small window 30 is hidden, the user may learn, based on the prompt information, that the small window 30 is currently hidden (in other words, the small window 30 is running in the background). If the user wants to re-invoke the hidden small window 30, in addition to the gesture of sliding two fingers downward shown in FIG. 7, the user may further invoke the small window 30 by tapping the prompt bar 50 or the floating window 60 shown in FIG. 6a and FIG. 6b.

In an optional implementation, a display interface of the re-invoked small window 30 may be the same as the display interface presented when the small window 30 is hidden. For example, if a home page screen of WeChat is entered when the small window 30 is hidden, the home page screen of WeChat is also entered when the small window 30 is re-invoked. In another optional implementation, a display interface of the re-invoked small window 30 may be different from the display interface presented when the small window 30 is hidden. For example, if an official account interface of WeChat is entered when the small window 30 is hidden, a home page screen of WeChat may be entered when the small window 30 is re-invoked, to help the user view a WeChat message.

In an optional method, a position of the re-invoked small window 30 on the display 10 may be the same as a position of the small window 30 on the display 10 when the small window 30 is hidden. In another optional manner, a position of the re-invoked small window 30 on the display 10 may be different from a position of the small window 30 on the display 10 when the small window 30 is hidden. For example, the position of the re-invoked small window 30 on the display 10 may be related to the gesture of sliding two fingers of the user downward in the embodiment shown in FIG. 7.

In addition to a gesture of sliding two fingers from the upper edging area of the display 10 to the internal part of the display 10, the user may also re-invoke the small window 30 by using a gesture of sliding two fingers from the lower edging area of the display 10 to the internal part of the display 10, a gesture of sliding two fingers from the right edging area of the display 10 to the internal part of the display 10, a gesture of sliding two fingers from a left edging area of the display 10 to the internal part of the display 10, or the like. Herein, the sliding gesture may start from an edging area of the display 10 or any area that is of the terminal 100 and that does not belong to the display 10, and end at any position on the display 10. The edging area of the display is a part that is of the display 10 and that is in contact with a part that does not belong to the display, and relative to the display edging area, the internal part of the display is an area on the display 10 other than the edging area.

Further, in the embodiment shown in FIG. 7, the terminal 100 may further determine, with reference to a detected speed of sliding two fingers of the user, whether to re-invoke the small window 30. For example, if the speed of sliding the two fingers is greater than a first value, the small window 30 is re-invoked. In another optional manner, the terminal 100 may further determine, with reference to a detected track length of sliding two fingers of the user on the display, whether to re-invoke the small window 30. For example, if the track length of sliding the two fingers is greater than a second value, the small window 30 is re-invoked. Herein, the first value and the second value may be preset by a system of the terminal or the user.

In some embodiments of this application, after the small window 30 is hidden, the user may re-invoke the small window 30 by using the gesture of sliding two fingers downward, and may further perform another operation by using a single-finger slide gesture. In other words, there is no conflict between the single-finger slide gesture and a two-finger slide gesture.

For example, when watching the video, the user may control a video progress by sliding a single finger left or right on the display, and control volume by sliding a single finger upward or downward.

For another example, the user may invoke a notification bar of the terminal 100 by using a gesture of sliding a single finger from the top to the bottom of the display. Specifically, the user may first tap any position on the display, and after the terminal 100 displays the status bar on the display 10 in response to the tap operation, the user may invoke the notification bar of the terminal 100 by using a gesture of sliding a single finger downward. The gesture of sliding a single finger downward to display the notification bar may be made at any position on the display 10.

Herein, the notification bar of the terminal 100 may include: a name of an operator (for example, China Mobile), a time, a Wi-Fi icon, signal strength, current remaining battery power, a quick enabling/disabling button of some functions (for example, Bluetooth, Wi-Fi, and one-touch screen lock) of the terminal 100, and an unread message (for example, a WeChat message or a QQ message) received by a running application.

In a possible implementation, in contact with the display of the terminal, different quantities of touch points are generated on the display during single-finger sliding and two-finger sliding. When receiving the single-finger slide gesture, the terminal may detect a single touch point. When receiving the two-finger slide gesture, the terminal may simultaneously detect two touch points or detect two touch points in a short period of time. Therefore, the terminal may distinguish, based on a quantity of detected touch points, whether the user enters the single-finger slide gesture or the two-finger slide gesture.

Figure 8:
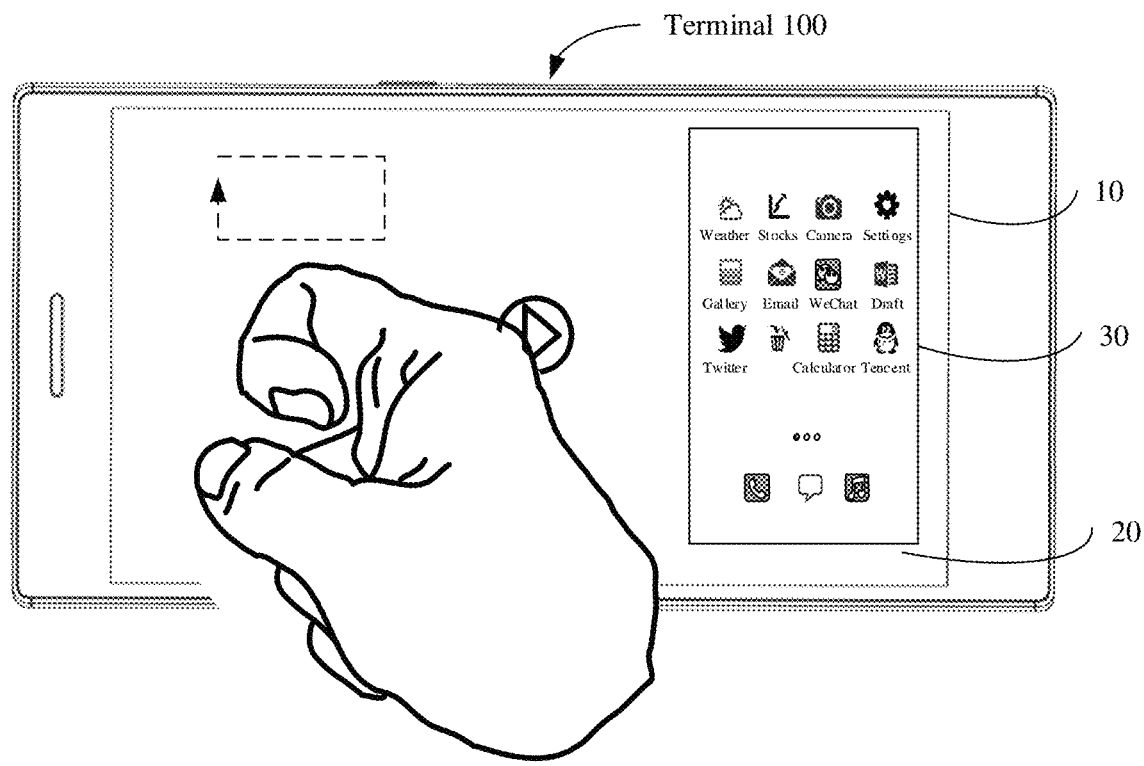

In some embodiments of this application, after opening a small window by using a gesture, the user may further draw, by using a knuckle, a rectangle in an area that is on the display and that does not belong to the small window, to open one or more other small windows. That is, a plurality of small windows may be simultaneously displayed on the display 10, and the user may separately control each small window. For example, as shown in FIG. 8, after opening the small window 30, the user may further open a second small window by drawing a rectangle by using a knuckle.

Figure 9A:
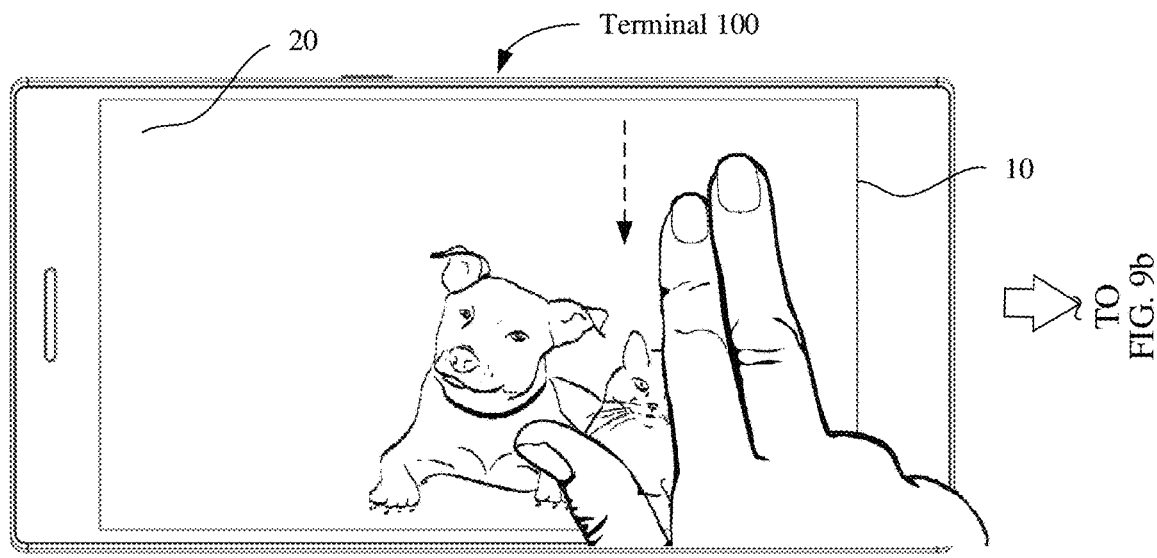
Figure 9B:
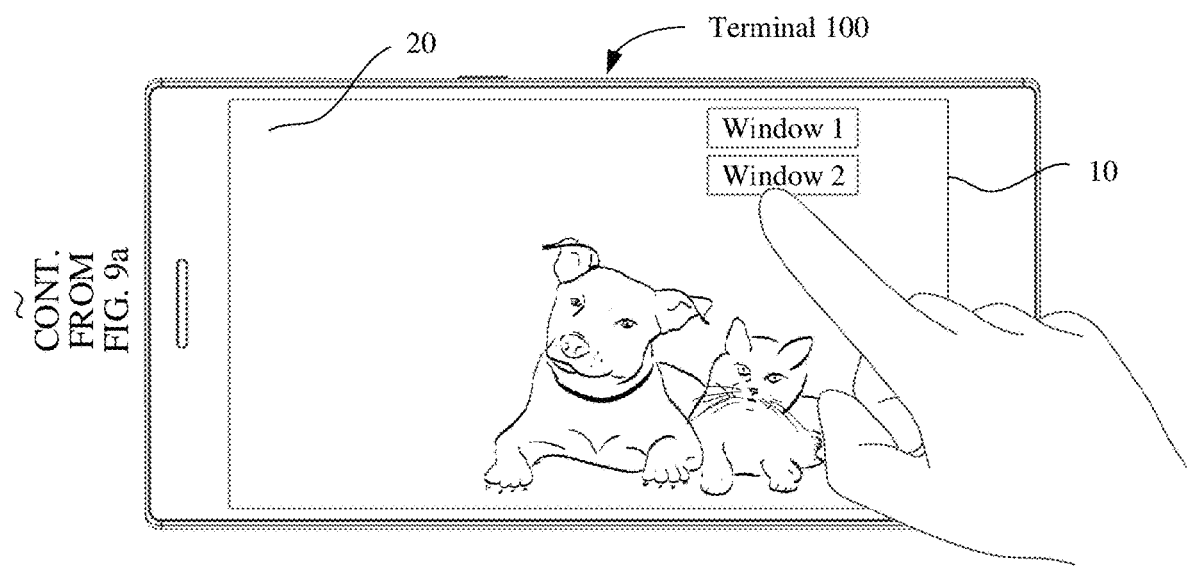
Figure 9C:
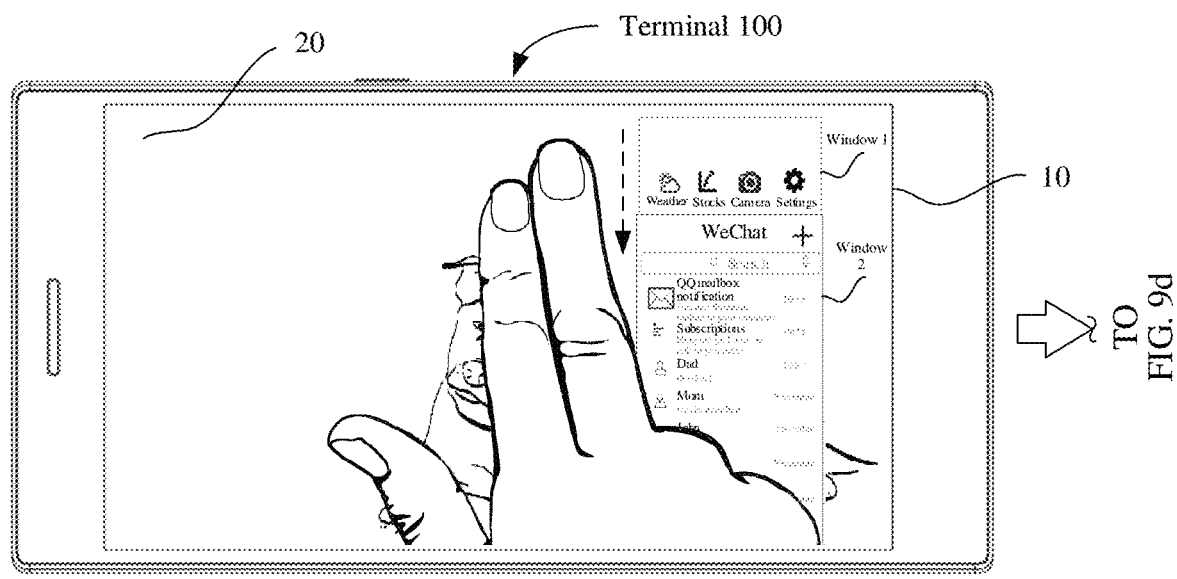
Figure 9D:
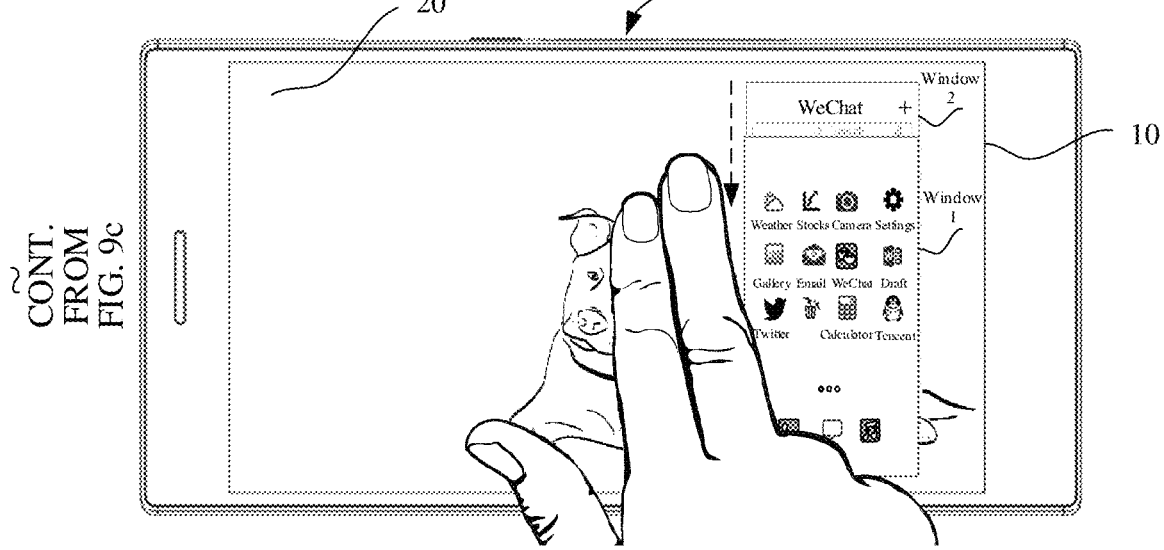
Figure 10A:
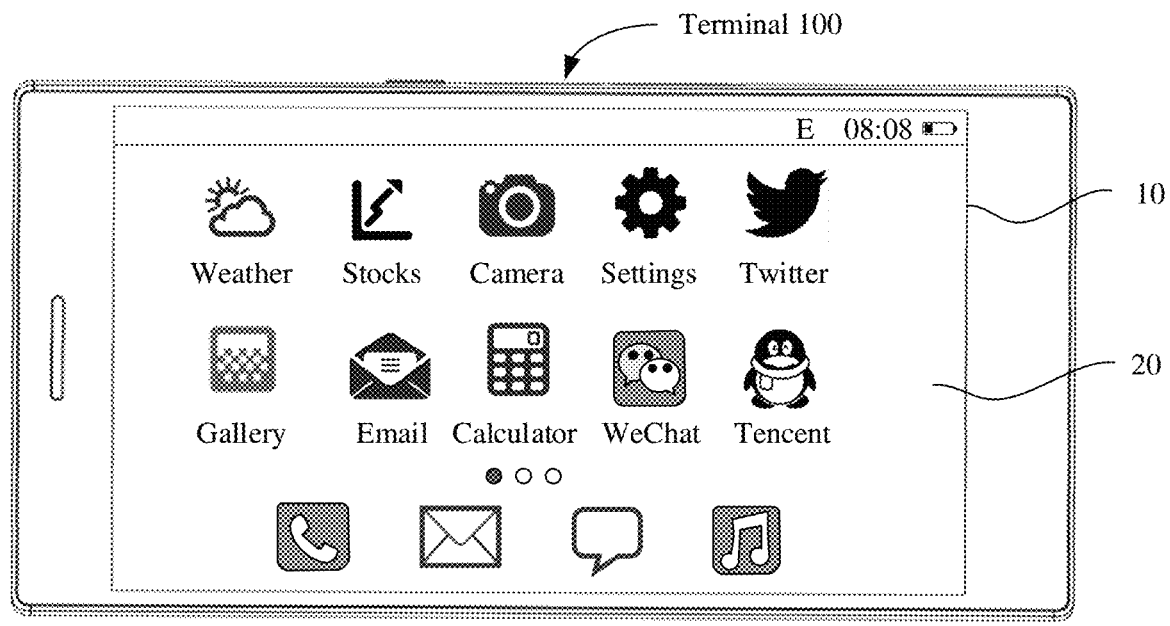
Figure 10B:
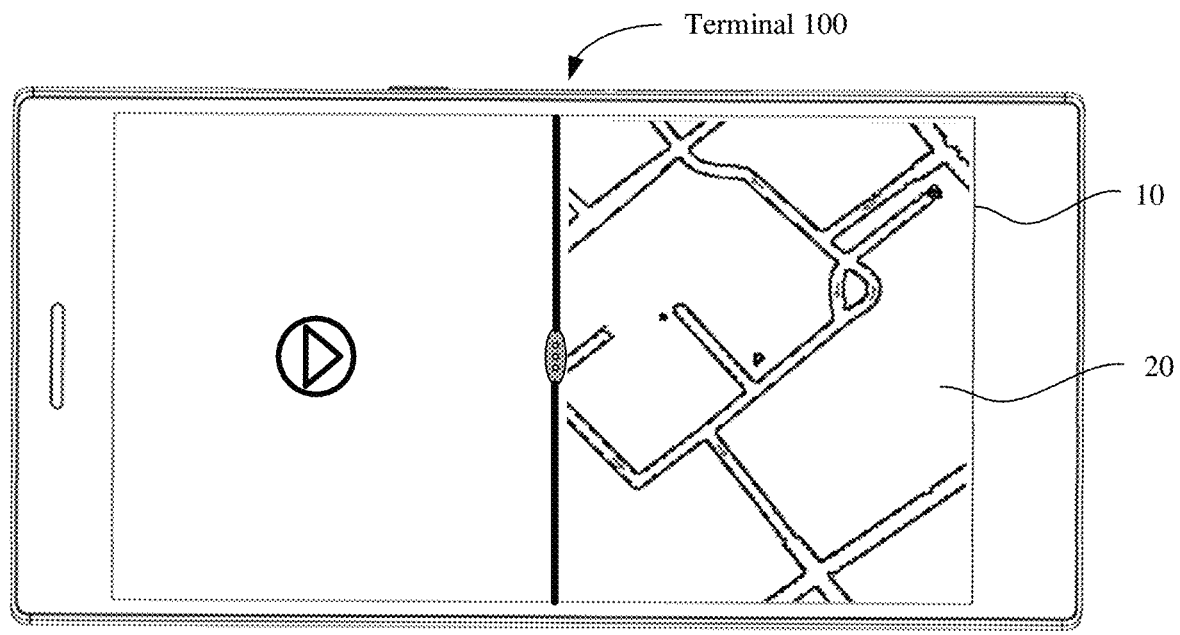
Figure 10C:
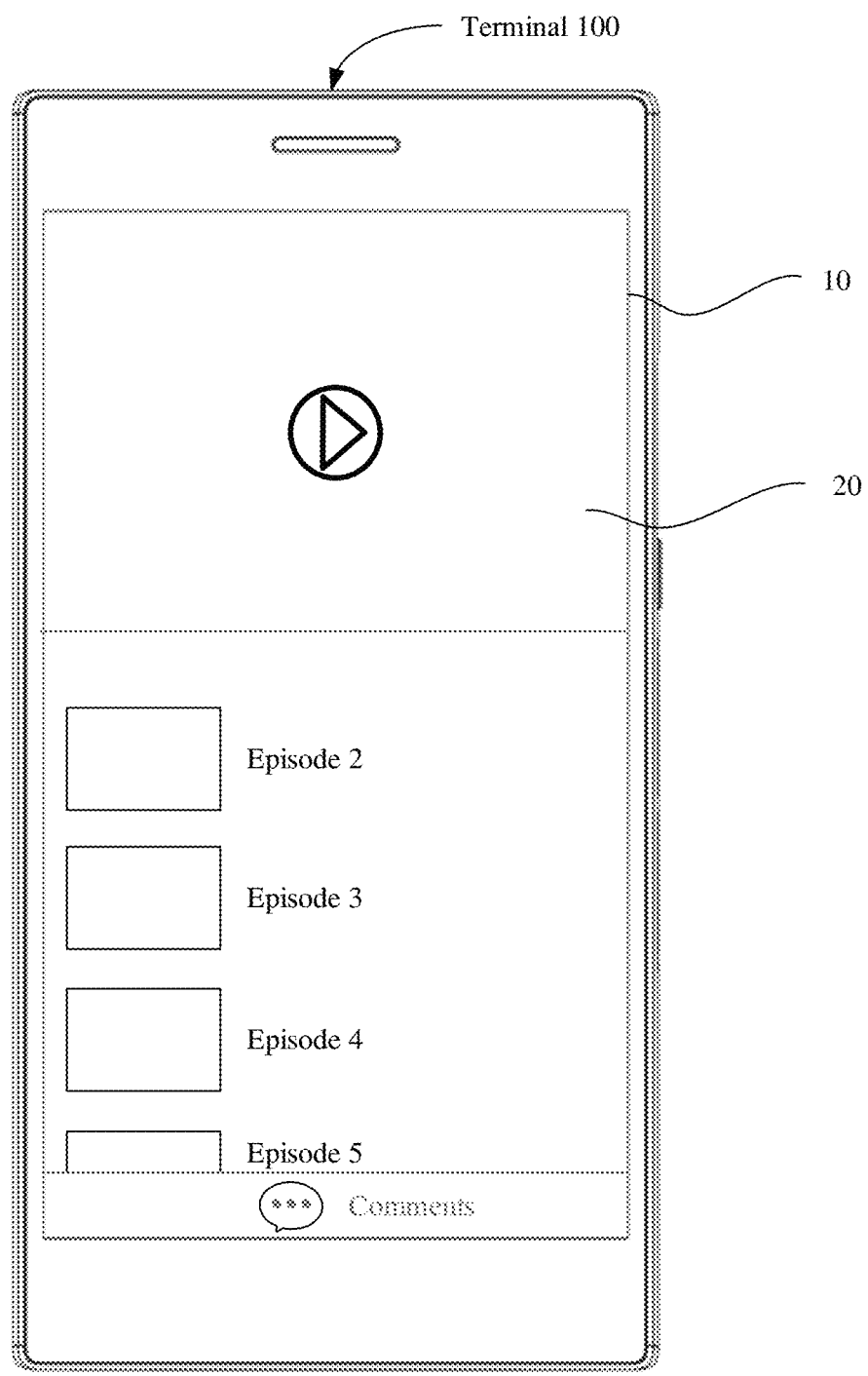
Figure 10D:
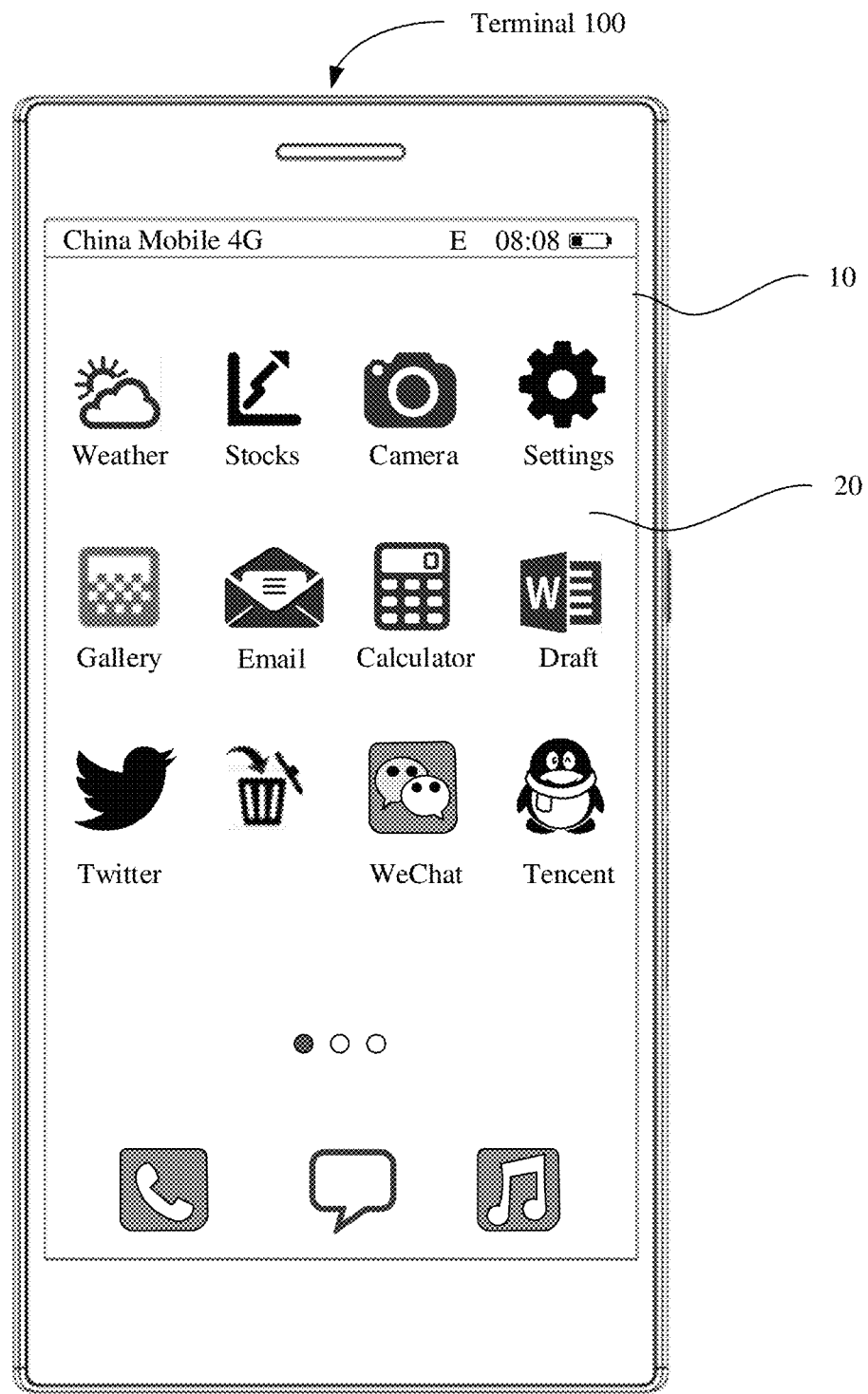
Figure 10E:
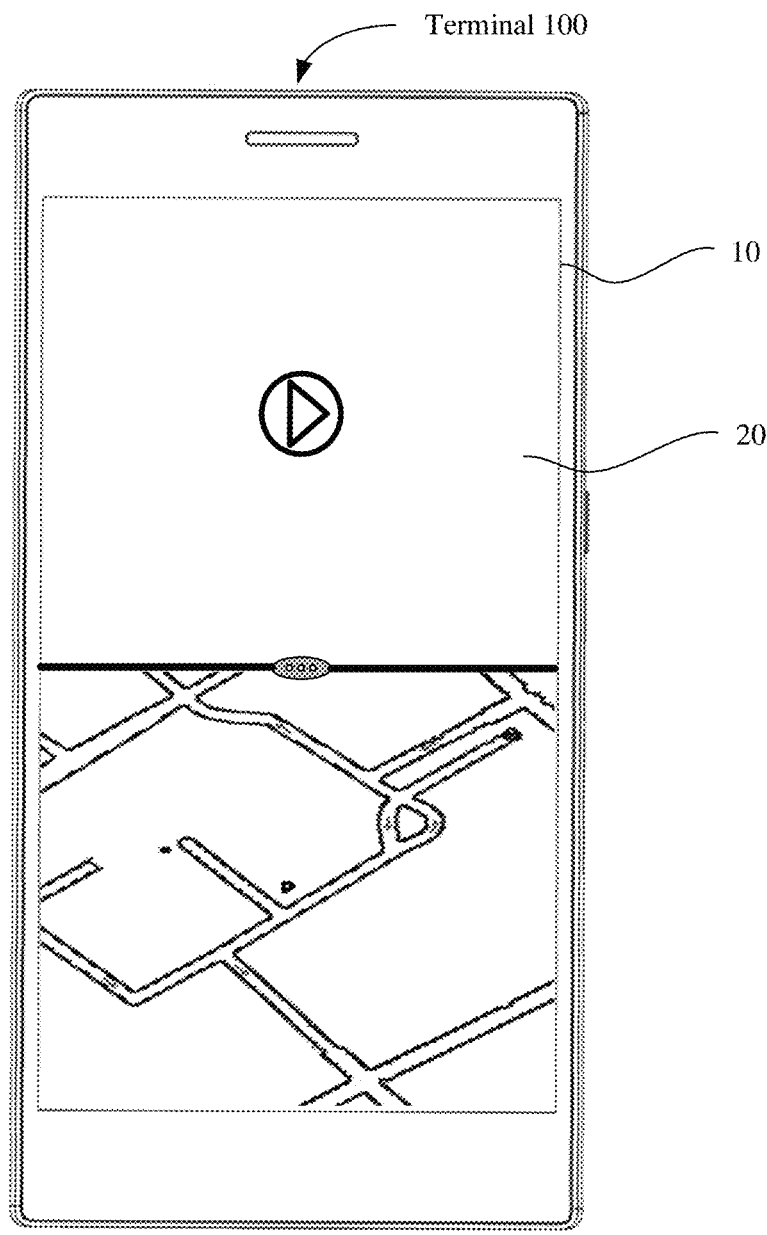

If the user opens and hides a plurality of small windows, any one of the small windows may be re-invoked by using the two-finger gesture shown in FIG. 7. In a possible implementation, as shown in FIG. 9a and FIG. 9b, after detecting the two-finger gesture entered by the user, the terminal may output a question to ask the user about a display interface of a small window to be invoked, and re-invoke a small window selected by the user. Herein, asking the user about a display interface of a small window to be invoked may include an option or a thumbnail of each small window. In another possible implementation, as shown in FIG. 9c and FIG. 9d, in a process in which the user enters the two-finger gesture, the display 10 displays each small window in a scrolling manner as a finger of the user slides, and re-invokes a small window displayed when the finger of the user leaves the display 10.

According to the embodiments shown in FIG. 1 to FIG. 8 and FIG. 9a to FIG. 9d, when watching the video, the user may open a small window by using a gesture, and view an instant messaging message in the small window. After viewing the message, the user may hide the small window, and may further re-invoke the small window. In such a method for quickly opening a small window, video playing is not affected, and may quickly switch between full-screen display and multi-window display. In addition, when the terminal is provided with a large-sized display (for example, a nine-inch display, a 10-inch display, or a larger display), an advantage of the large display can be fully used to present a plurality of windows.

In the embodiments in FIG. 1 to FIG. 8 and FIG. 9a to FIG. 9d, a specific application scenario is used as an example to describe the method for quickly invoking a small window in this application. The following describes another optional man-machine interaction embodiment provided in some embodiments of this application.

In addition to the video playing interface shown in FIG. 1, in some embodiments of this application, the interface content 20 may also be another display interface. As shown in FIG. 10a to FIG. 10e, the interface content 20 that is currently output by the system and that is displayed on the display 10 of the terminal 100 may be any one of: a desktop that is displayed in landscape mode in FIG. 10a and that is used to display an icon of an application, a split-screen interface displayed in landscape mode in FIG. 10b, a video playing interface displayed in portrait mode in FIG. 10c, a desktop displayed in portrait mode in FIG. 10d, a split-screen interface displayed in portrait mode in FIG. 10e, or the like. Displaying in landscape mode means that a width of the interface content displayed by the terminal is greater than a height of which, and displaying in portrait mode means that the height of the interface content displayed by the terminal is greater than the width of which. In addition to the interface content shown in FIG. 1 and FIG. 10a to FIG. 10e, the interface content 20 may be any other interface, for example, a game interface, a web page browsing interface, a book reading interface, a music playing interface, or a text editing interface. The interface content 20 may further include a system-level interface element, for example, a floating shortcut menu. This is not limited herein.

When the system of the terminal detects an input user operation, the terminal may display the small window 30 in the hover box when displaying the interface content 20 on the display 10. The following describes in detail a user operation that is provided in certain embodiments of this application and that is used to trigger the terminal to display the small window 30.

In an embodiment of this application, the user may trigger, in the following two cases, the terminal to display the small window 30.

(1) In a first case, the user actively triggers the terminal to display the small window 30.

In this case, the user may trigger the terminal to display the small window 30 at any time. The following describes a manner in which the user actively triggers the terminal to display the small window 30.

In addition to drawing a rectangle by sliding the knuckle shown in FIG. 2, in some embodiments of this application, the user may further draw another graph by sliding the knuckle, for example, a triangle, a circle, or an arc, to trigger the terminal to display the small window 30 when displaying the interface content 20 on the display 10. The graph such as a rectangle, a circle, a triangle, or an arc mentioned herein may not be a standard shape in a geometric sense, but only needs to be similar to the standard shape.

Figure 11A:
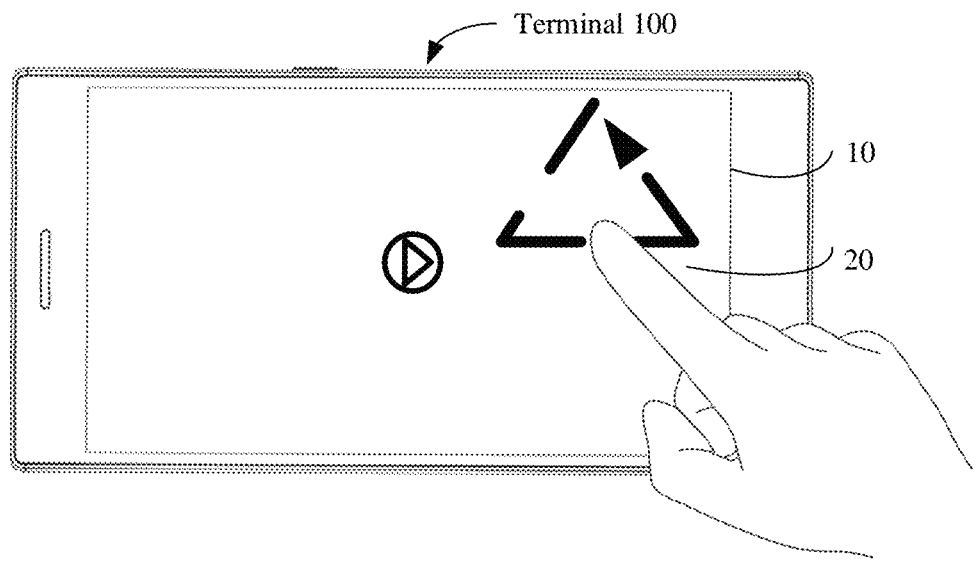
Figure 11B:
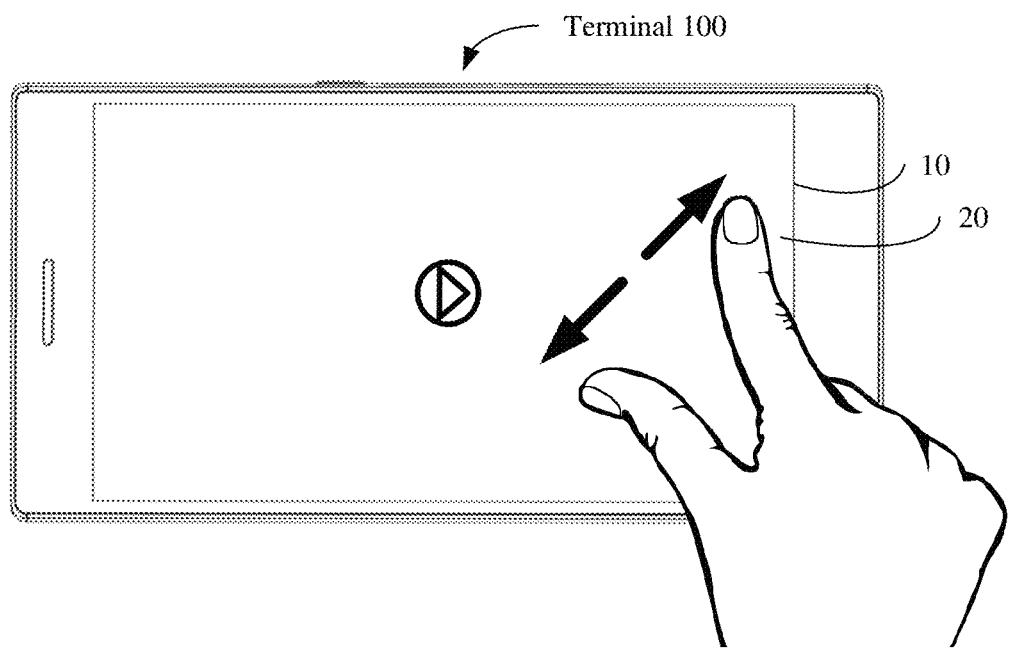

In some embodiments of this application, the user may further draw a graph by sliding another body part or a tool, to trigger the terminal to display the small window 30. For example, the user may draw a graph by sliding a fingertip, a finger pad, an elbow, a stylus, or the like. This is not limited herein. For example, as shown in FIG. 11a, the user may draw a triangle by sliding one or more finger pads on the display 10. For example, as shown in FIG. 11b, the user may further slide two fingers outwards in different directions. In some embodiments of this application, the user operation used to trigger the terminal to display the small window 30 may be preset by the system of the terminal, or may be set by the user based on an operation habit of the user.

Herein, when sliding to draw a graph, the user may continuously slide, or may discontinuously slide. This is not limited in embodiments of this application.

In a possible implementation of the embodiments in FIG. 2 and FIG. 11a to FIG. 11d, when the system of the terminal detects that a touch point (for example, a knuckle, a finger pad, or a stylus) is in contact with the display, an area in which the touch point is in contact with the display may be highlighted, to prompt for entering of a multi-window display interface. In this case, the system of the terminal detects that the user completes graphic drawing, in other words, the touch point leaves the display, the system determines that the user determines to trigger multi-window display, and executes a corresponding program that triggers multi-window display to enter the multi-window display interface. That is, the terminal displays the small window 30 when displaying the interface content 20 on the display 10.

In addition to sliding to draw a graph in the embodiments in FIG. 2 and FIG. 11a to FIG. 11d, the user may further trigger, by using a tap operation on the display 10, the terminal to display the small window 30. Herein, the tap operation may be performed by using one or more knuckles, finger pads, fingertips, styluses, or the like.

In some embodiments of this application, the system of the terminal may further determine, with reference to a frequency of the tap operation, whether to trigger the terminal to display the small window 30. For example, when the system of the terminal detects that the user single-taps, double-taps, or triple-taps the display, the terminal displays the small window 30 when displaying the interface content 20 on the display 10.

Figure 11C:
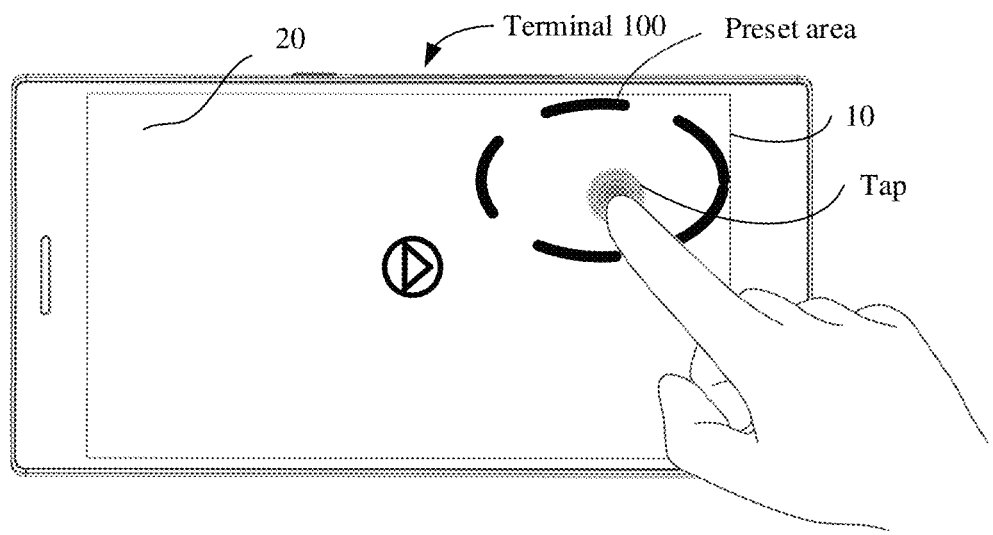

In some embodiments of this application, the system of the terminal may further determine, with reference to an area in which the tap operation is performed, whether to trigger the terminal to display the small window 30. For example, as shown in FIG. 11c, when the system of the terminal detects that the user performs the tap operation in a preset area on the display 10, the terminal displays the small window 30. Herein, a position, a shape, a size, and the like of the preset area on the display may be preset by the terminal, or may be set by the user based on an operation habit of the user.

Figure 11D:
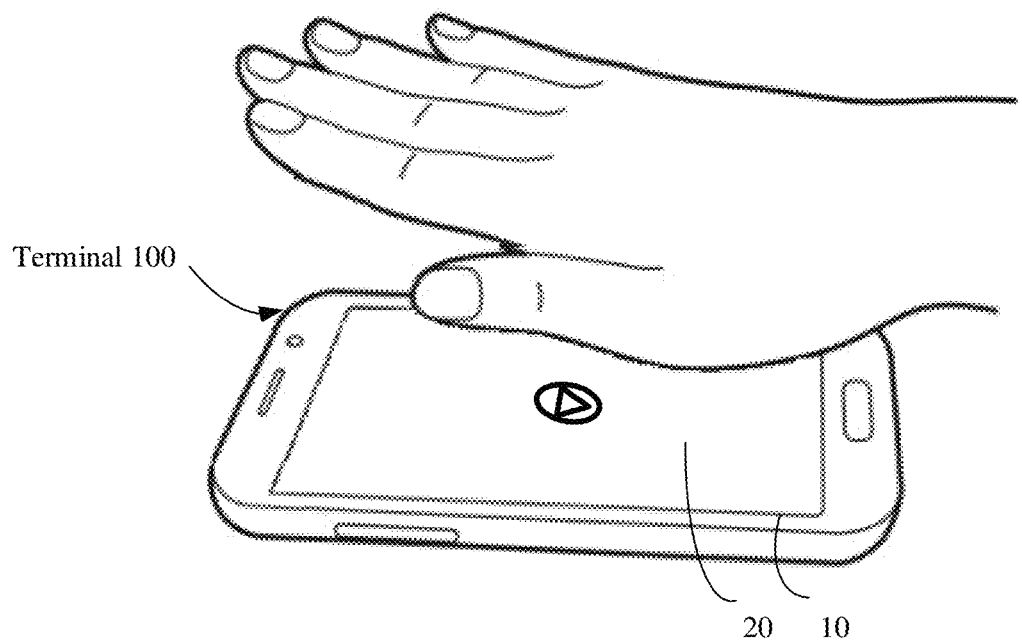

In an embodiment of this application, as shown in FIG. 11d, the user may further trigger, by using a floating posture of a finger above the display of the terminal, the terminal to display the small window 30. Herein, the floating posture may mean that the finger floated above the display is in a straight state, a bent state, or the like. In a possible implementation, the terminal may sense an object in three-dimensional space above the display and a motion of the object by using a floating detector, to detect the floating gesture of the finger of the user.

In some embodiments of this application, the user operation used to trigger the terminal to display the small window 30 is not only limited to the foregoing example, and may also be another manner. For example, the user operation may alternatively be a touch and hold operation performed by the finger of the user on the display. In addition, not all user operations that are used to trigger the terminal to display the small window 30 are initiated on the display of the terminal.

For example, the user operation may also be a voice instruction, eyeball rotation, terminal shaking, or the like.

(2) In a second case, the user passively triggers the terminal to display the small window 30.

In the second case, when the terminal 100 outputs prompt information, the user may trigger the terminal to display the small window 30. Herein, the prompt information output by the terminal 100 includes but is not limited to prompt information indicating that the instant messaging application receives a new message, a reminder item established by the user, and the like. The prompt information output by the terminal 100 may be displayed in a top area of the display 10, and cover a part of the display area of the interface content 20. The prompt information may display only for a preset period of time, and automatically disappears after the prompt information is displayed for the preset period of time.

In the second case, when seeing the prompt information, the user may trigger the terminal to display the small window 30. In some embodiments, a manner in which the user triggers the terminal to display the small window 30 may be the same as that in the first case. In some other embodiments, the user may tap the prompt information output by the terminal 100, to trigger the terminal to display the small window 30.

In the foregoing two cases, the user operation used to trigger the terminal to display the small window 30 is not limited to a default setting of the terminal at delivery, and may also be autonomously set by the user. Specifically, the user may select, from a setting menu that includes a plurality of operations, a proper operation as the user operation, or the user may customize the user operation based on a habit of the user.

When the system of terminal detects the user operation used to trigger the terminal to display the small window 30, in response to the detected user operation, the terminal enters the multi-window display interface. To be specific, the terminal displays the small window 30 when displaying the interface content 20 on the display 10. The following describes a display manner of the small window 30 in some embodiments of this application.

In addition to the small window 30 vertically displayed in a right area on the display 10 shown in FIG. 3, in some embodiments of this application, the small window 30 may further have different display positions. In some embodiments of this application, the small window 30 may be displayed in any area such as a left area, a right area, an upper-left area, or an upper-right area of the display 10. The small window 30 may be displayed horizontally or vertically.

In some embodiments of this application, a shape of the small window 30 displayed on the display 10 is not limited to the rectangle in FIG. 3, and may alternatively be another shape, for example, a square or a circle.

In some embodiments of this application, a size of the small window 30 displayed on the display 10 may be different from that in FIG. 3. For example, an area covered by the small window 30 may be greater than or less than an area covered by the small window 30 in FIG. 3.

In some optional embodiments, the shape, the position, and the size of the small window 30 may be set by the system of the terminal by default. For example, as shown in FIG. 3, the system may specify, by default, that the small window 30 is a vertical rectangular interface in the right area on the display 10.

In some optional embodiments, the shape, the position, and the size of the small window 30 may be set by the user based on a use habit of the user. As shown in FIG. 4, if the user often opens chat software when watching a video, the user may use a right rectangular area on the display as a display area of the small window 30, so that the user can conveniently operate, by using a right hand, a WeChat interface displayed in the small window 30.

In some optional embodiments, the shape, the position, and the size of the small window 30 may also be determined in real time based on a user operation. As shown in FIG. 2, when the user slides the knuckle to draw a rectangle to trigger displaying of the small window 30, the small window 30 may be a rectangle, and a position of the small window 30 may be centered at an area in which the knuckle of the user touches the display. As shown in FIG. 11b, when the user slides two fingers outwards in different directions to trigger displaying of the small window 30, the size and the position of the small window 30 may be related to a position in which the two fingers of the user stop sliding on the display. For example, when there is a larger distance between the positions in which the two fingers of the user stop sliding on the display, the small window 30 is larger. For another example, an area in which the small window 30 is located may cover the track of a two-finger slide of the user.

Figure 12:
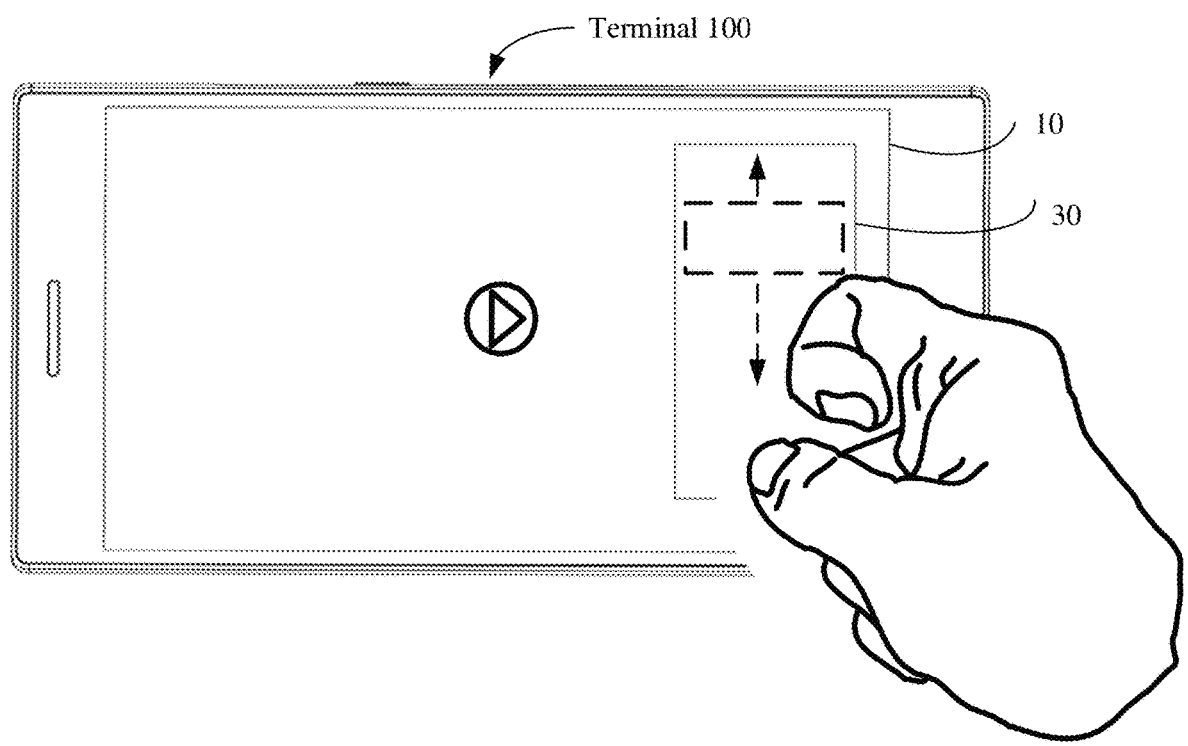

In some embodiments of this application, a presentation effect of the small window 30 may be dynamic. For example, as shown in FIG. 12, when the system of the terminal detects the user operation used to trigger display of the small window 30, in response to the detected user operation, the small window 30 may gradually expand from the first area to the second area, that is, the small window 30 is finally displayed in the second area. Herein, the first area may be an area in which a rectangle drawn by the knuckle of the user in FIG. 2 is located, an area in which a triangle drawn by a finger of the user in FIG. 11a is located, an area in which a finger of the user touches the display 10 in FIG. 11c, or the like, and the second area is an area in which the small window 30 is finally displayed.

In some embodiments of this application, when detecting the user operation used to trigger displaying of the small window 30, the system of the terminal may further directly display the small window 30 on the display 10 in response to the detected user operation.

Figure 13A:
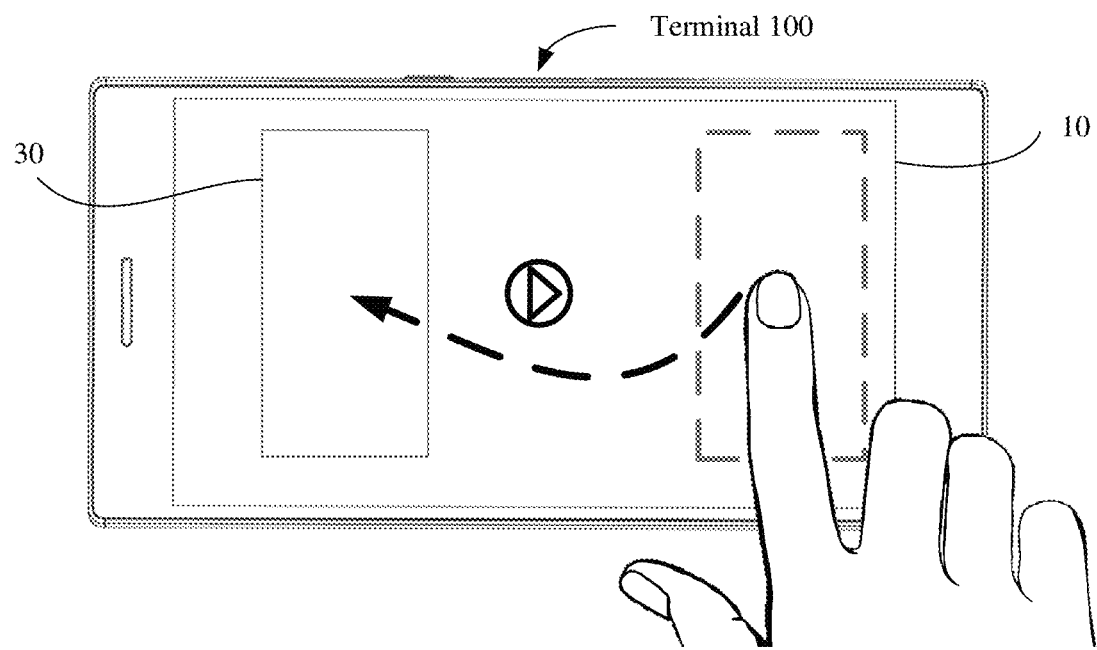
Figure 13B:
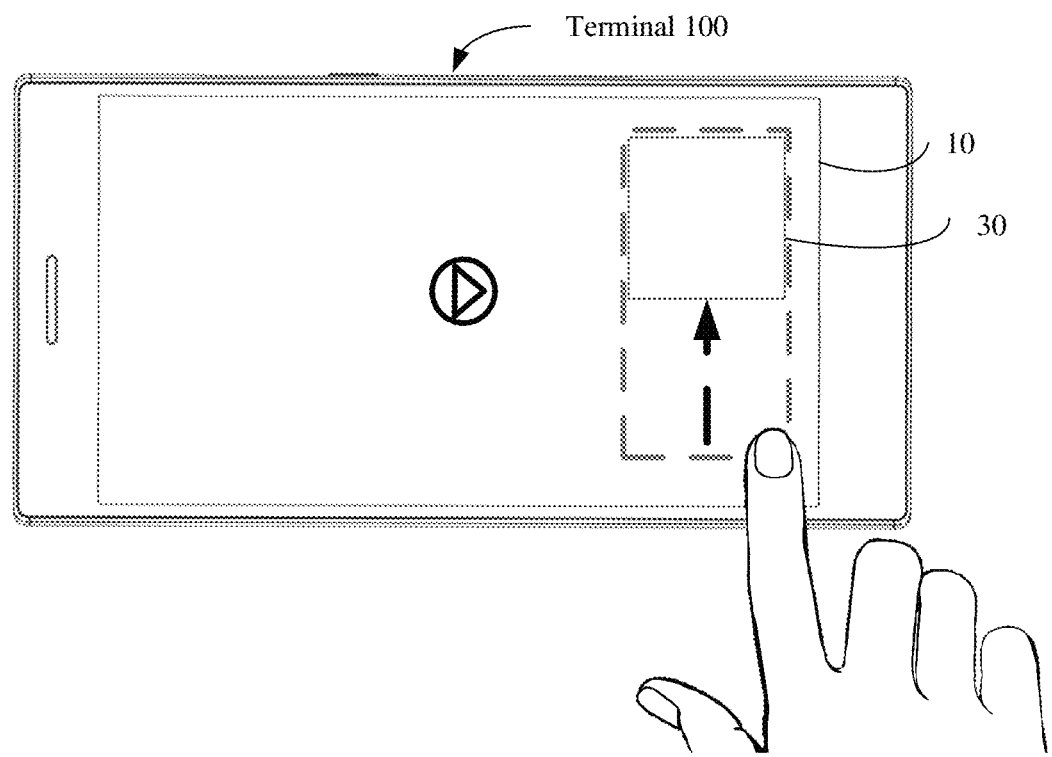
Figure 13C:
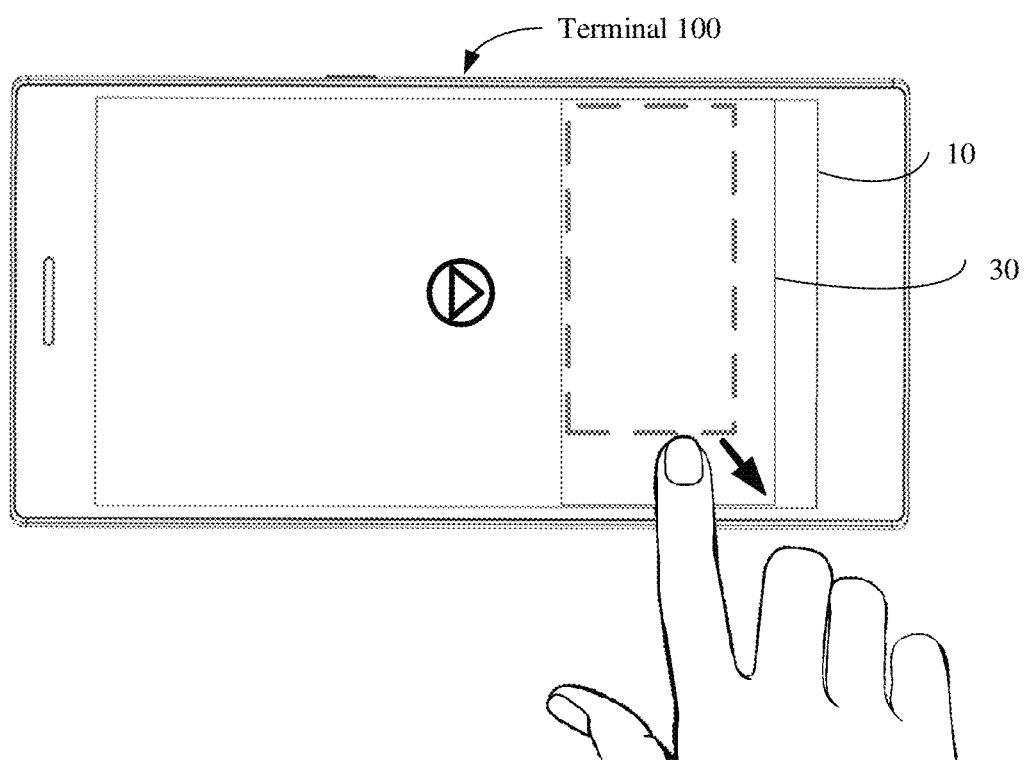

In some embodiments of this application, after the small window 30 is displayed on the display 10, the user may adjust the display position, the shape, the size, and the like of the small window 30 as needed. In this application, an operation used to adjust a display status of the small window 30 may be referred to as a sixth user operation. For example, FIG. 13a to FIG. 13c show several embodiments in which the user adjusts the small window 30. A dashed line represents the small window existing before adjustment, and a solid line represents the small window obtained after adjustment. The following describes in detail an adjustment manner of the small window 30 in certain embodiments of this application.

Figure 15A:
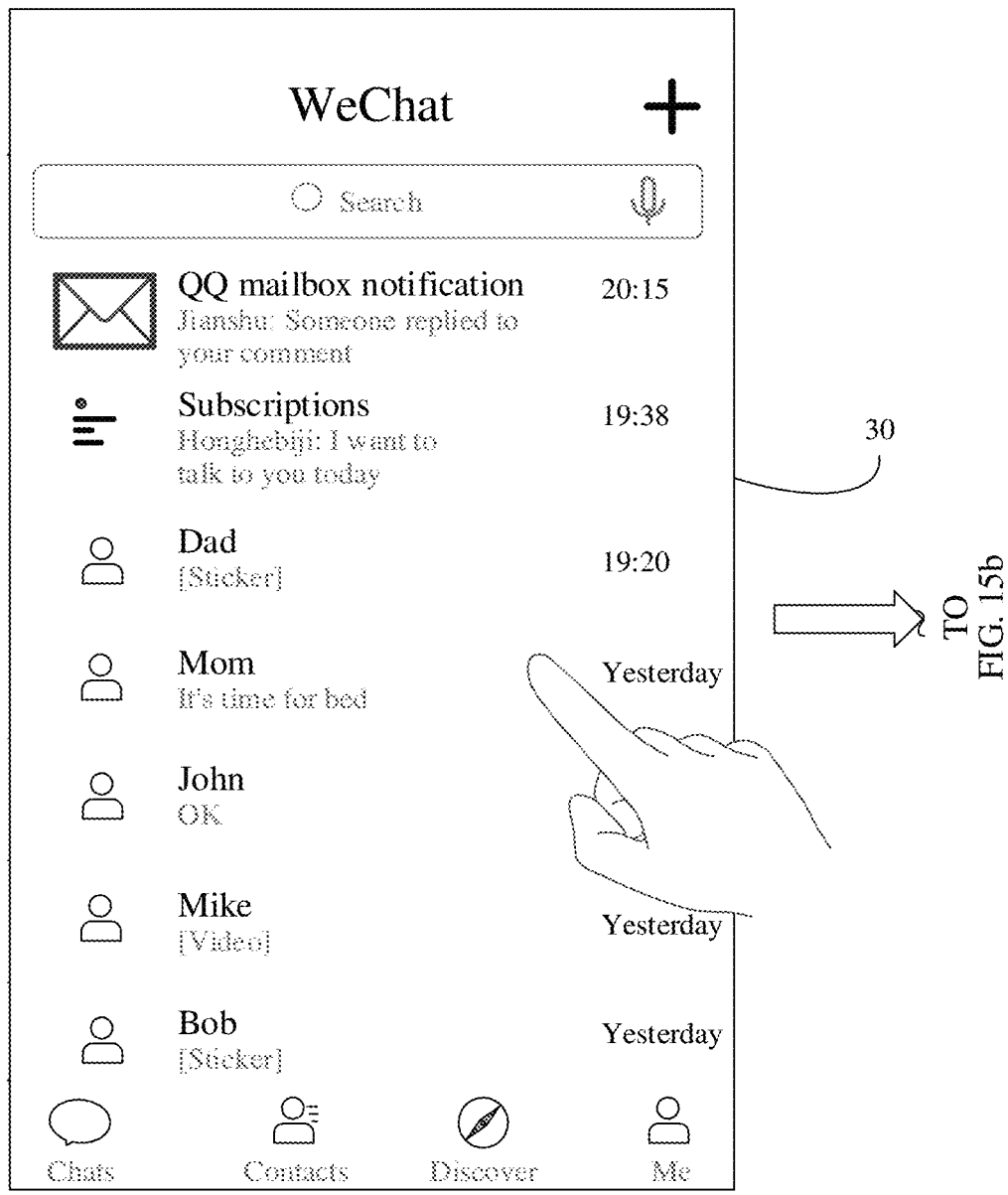

FIG. 13a shows an embodiment in which the user adjusts the position of the small window 30. As shown in the figure, the user may touch and hold any area of the small window 30. When the system of the terminal detects that the touch and hold operation lasts a period of time longer than a threshold, the small window 30 may move as a finger moves. In FIG. 15a, the display position of the small window 30 moves from a right area on the display 10 to a left area along a sliding track of the finger of the user.

FIG. 13b shows an embodiment in which the user adjusts the shape of the small window 30. As shown in the figure, the user may drag an edge position of the small window 30 by using a finger, to adjust the shape of the small window 30 from a rectangle to a square.

FIG. 13c shows an embodiment in which the user adjusts the size of the small window 30. As shown in the figure, the user may drag a lower right corner of the small window 30 by using a finger. An upper left corner of the small window 30 does not move, and a lower right corner of the small window 30 expands to an edge position of the display 10 along a sliding track of the finger.

In an optional implementation in FIG. 13c, a final size of the small window 30 is related to a position in which a finger of the user touches the display 10 when the user ends a drag operation. For example, if the finger is located in the lower right corner of the display 10 when the user ends the drag operation, a lower right corner of the adjusted small window 30 is also located in the lower right corner of the display 10.

In another optional implementation in FIG. 13c, the system of the terminal presets a plurality of sizes. When the user ends the drag operation, the position of the finger on the display and the upper left corner of the small window 30 may correspond to a rectangular area. The system of the terminal selects, from the plurality of preset sizes, a size closest to a size of the rectangle as a final size of the small window 30.

In some embodiments of this application, the user operation used to adjust the small window 30 is not only limited to the foregoing example, and may also be another manner. For example, the user may further adjust the size of the small window 30 by tapping an adjustment option (for example, "scaling up the small window" or "scaling down the small window") or an icon that is output by the system of the terminal on the display 10.

In a possible implementation, after the shape or the size of the small window 30 is adjusted, a display manner of an interface element in the small window 30 may be adaptively adjusted to conform to a user habit and display beauty. For example, after the small window 30 is scaled down, the interface element or the like in the small window 30 may be scaled down in proportion for displaying, or only some original interface elements in the small window 30 may be displayed. In actual application, adaptively adjusting the display manner of the interface element in the small window 30 may further include adjusting a spacing between interface elements, a display position of the interface element, and the like. This is not limited in embodiments of this application.

In some embodiments of this application, after the small window 30 is opened, in addition to the icon that is of application and that is shown in FIG. 3, the small window 30 may further display information of another type. The following lists two possible display cases of the small window 30 by using an example.

Figure 14A:
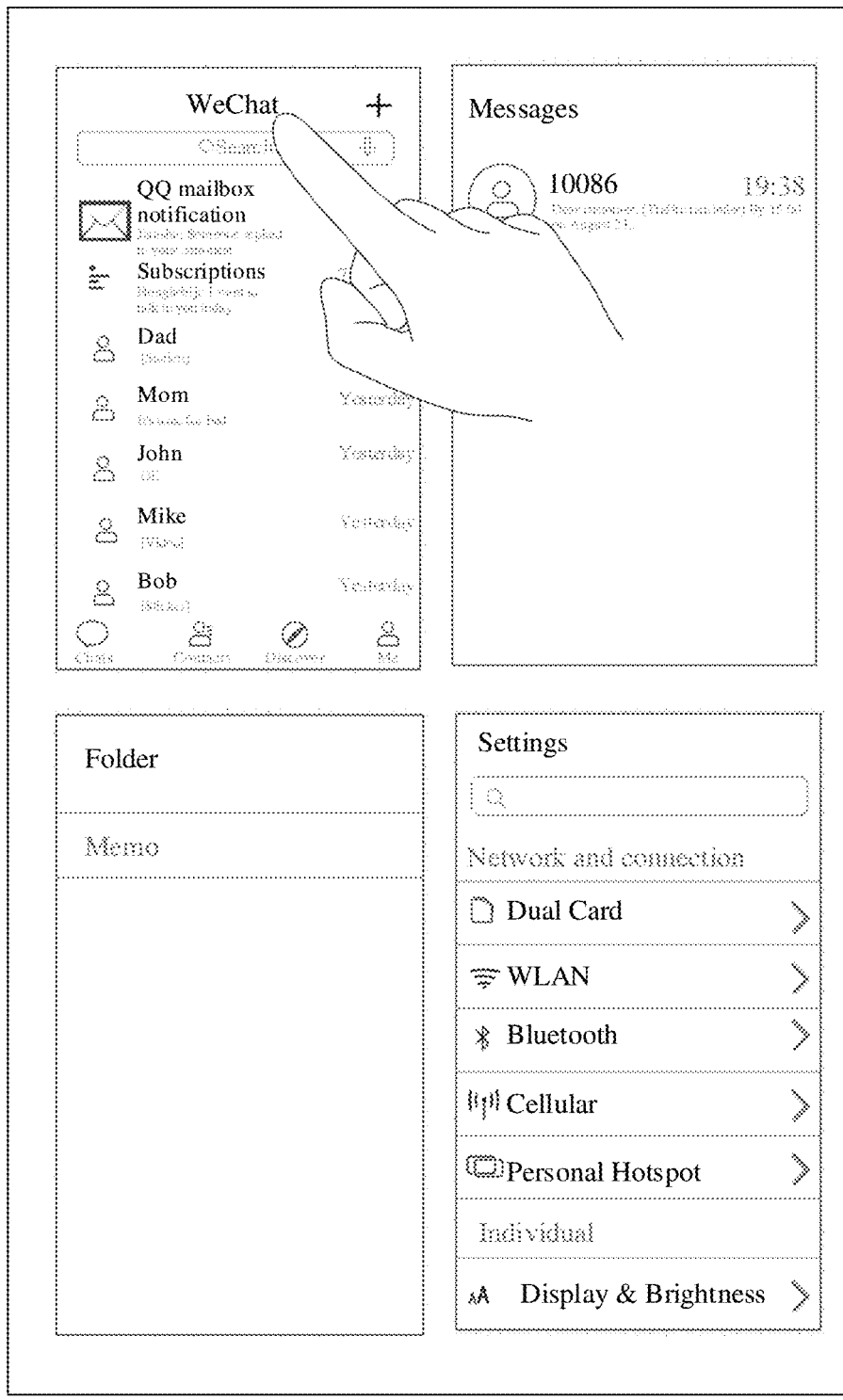

In a first case, in some embodiments of this application, the small window 30 may display a thumbnail of one or more applications. For example, as shown in FIG. 14a, thumbnails of a plurality of applications may be displayed in the small window 30 in a tiled manner. In addition to a manner of displaying the thumbnails in the tiled manner in FIG. 14a, the thumbnails may also be displayed in a stacked manner. This is not limited herein. Herein, the thumbnail of the application may display an interface displayed when the user last exits the application, or may be a home page of the application. This is not limited in embodiments of this application.

In an optional implementation, the thumbnail displayed in the small window 30 may be any one of: (1) a thumbnail of an application that has been opened in the terminal 100 in a recent period of time (for example, one hour or one day); (2) a thumbnail that is of an application and that is preset by the user; or (3) a thumbnail that is of an application and that is specified by the terminal based on a habit of the user, where for example, the terminal may record and learn of an operation habit of the user, and if the user often opens WeChat in the small window 30, the terminal may automatically specify that a thumbnail of WeChat is displayed in the small window 30.

Figure 14B:
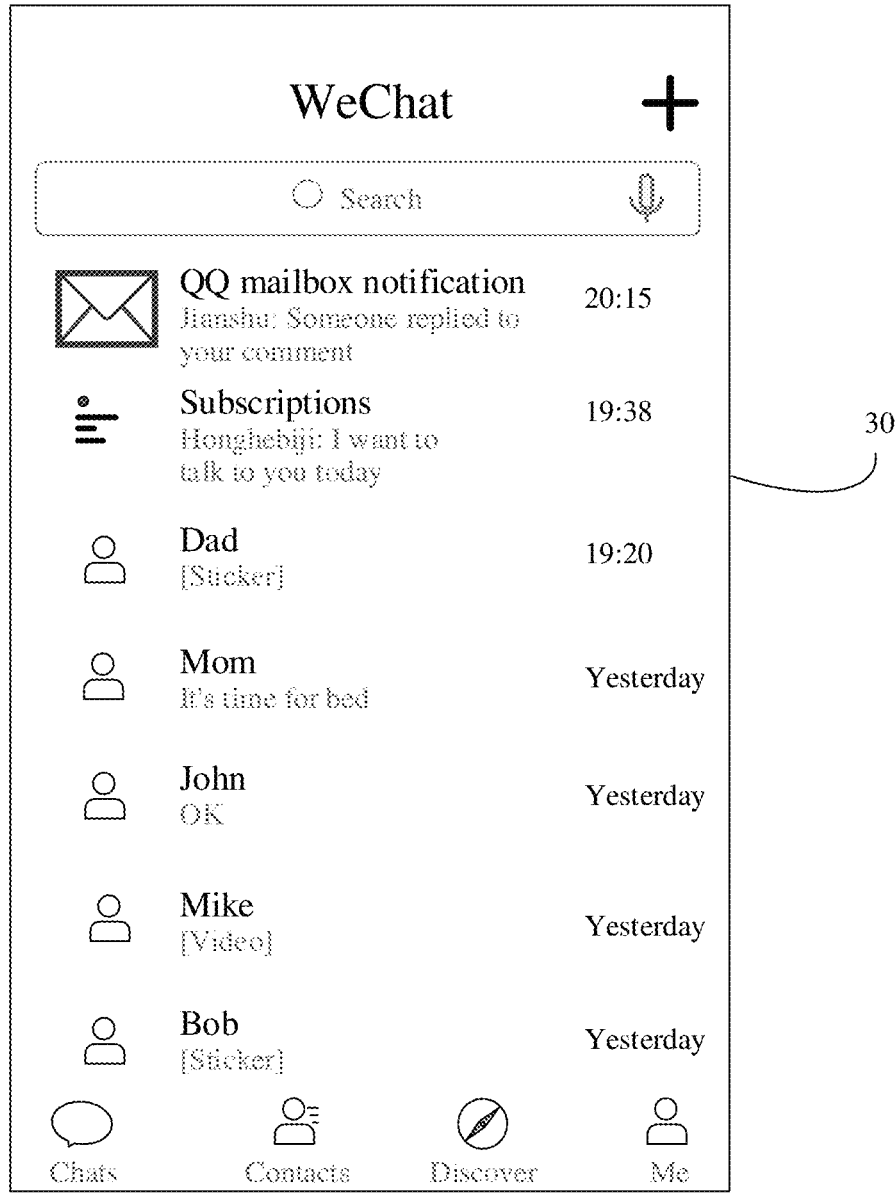

When the thumbnail of the application is displayed in the small window 30, the thumbnail of the application may be used to receive a user operation, and output a corresponding interface based on the received user operation. For example, the user may slide left, right, upward, or downward in the small window 30 to switch between thumbnails of different applications. For another example, the user may tap a thumbnail of any application in the small window 30 to enter the application. For example, as shown in FIG. 14a and FIG. 14b, the user may tap the thumbnail of WeChat to enter a WeChat interface.

In a second case, in some embodiments of this application, the small window 30 may further directly display an application interface. For example, as shown in FIG. 15a, a display interface of WeChat may be displayed in the small window 30. In an optional implementation, an application interface directly displayed in the small window 30 may be any one of: (1) an interface of an application that is last opened in the terminal 100; (2) an application interface preset by the user; or (3) an application interface specified by the terminal based on a habit of the user, where for example, the terminal may record and learn of an operation habit of the user, and if the user often opens WeChat in the small window 30, the terminal may automatically enable, through setting, the small window 30 to display the display interface of WeChat. Herein, the application interface displayed in the small window 30 may display an interface displayed when the user last exits the application, or may be a home page of the application. This is not limited in embodiments of this application.

Figure 15B:
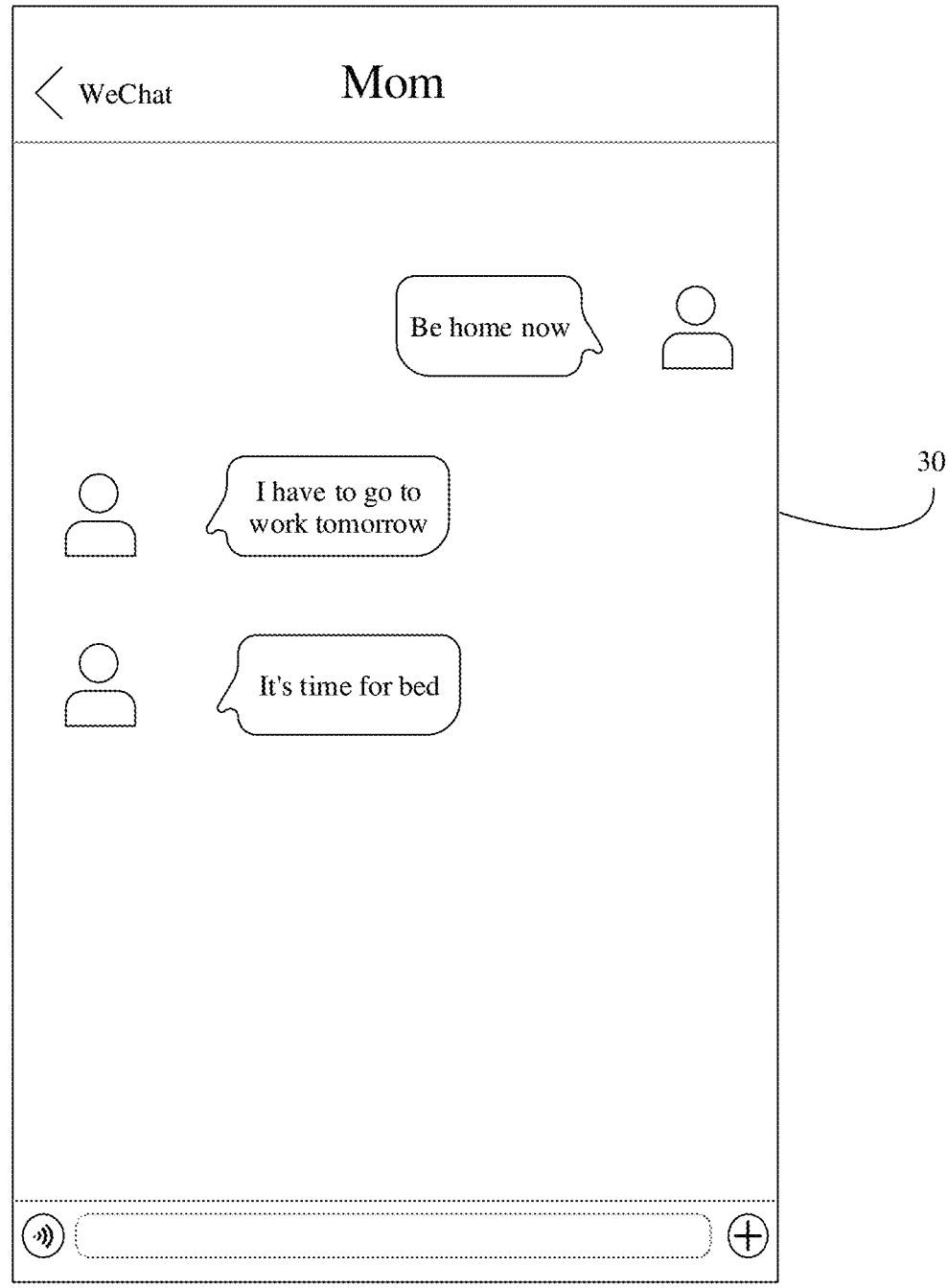

When the small window 30 directly displays the application interface, the application interface may be used to receive a user operation, and output a corresponding interface based on the received user operation. For example, as shown in FIG. 15a and FIG. 15b, the user may tap a morn's chat box on the WeChat interface, to view a chat record between the user and the mom.

In some embodiments of this application, the small window 30 may not only display the icon of the application, the thumbnail of the application, and the application interface that are shown in FIG. 3, but may also have another display manner. For example, the small window 30 may display a list of names of one or more applications.

In a possible implementation of this application, a resource conflict may occur between the interface content 20 and the small window 30. For example, when the interface content 20 is a video playing interface, and the user opens WeChat in the small window 30 to play a voice message, a conflict occurs between audio resources. In some embodiments of this application, a resource conflict may be resolved in any one of the manners: (1) Resources are invoked based on a priority. For example, an interface on which the user performs a last operation has a highest priority. If the user performs the last operation in the small window 30, playing of a video in the interface content 20 is stopped. After the voice message in the small window 30 is played, the video in the interface content 20 may continue to be played. (2) The terminal is provided with a plurality of sets of audio resources. For example, the terminal may be provided with all of a speaker, an earpiece, an earphone hole, and the like. The user may hear a video playing sound in the interface content 20 by using the speaker, and hear a voice message in the small window 30 by using the earpiece or the earphone.

In some embodiments of this application, the small window 30 may be hidden. In addition to the manner for hiding the small window 30 shown in FIG. 5, the small window 30 may also be hidden in another manner. For example, similar to FIG. 5, the user may also hide the small window 30 by using a gesture of sliding three or four fingers from the small window 30 to an upper edging area of the display 10. For another example, referring to FIG. 16*a*, the user may separately touch different positions in the small window 30 by using two fingers, and slide inwards and towards a central area of the small window 30, to trigger the terminal 100 to hide the small window 30. For another example, the user may use a finger to touch a focus on the display 10 to transfer the focus from the small window 30 to the interface content 20, to trigger the terminal 100 to hide the small window 30. For example, referring to FIG. 16*b*, the user may tap any area in the interface content 20 to hide the small window 30.

Figure 16A:
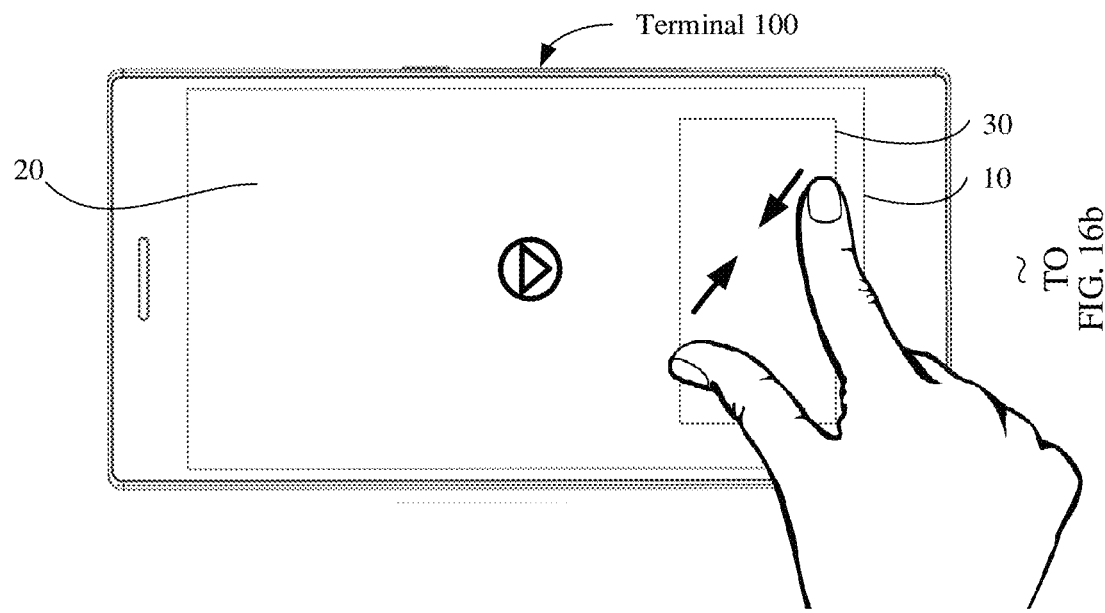
Figure 16B:
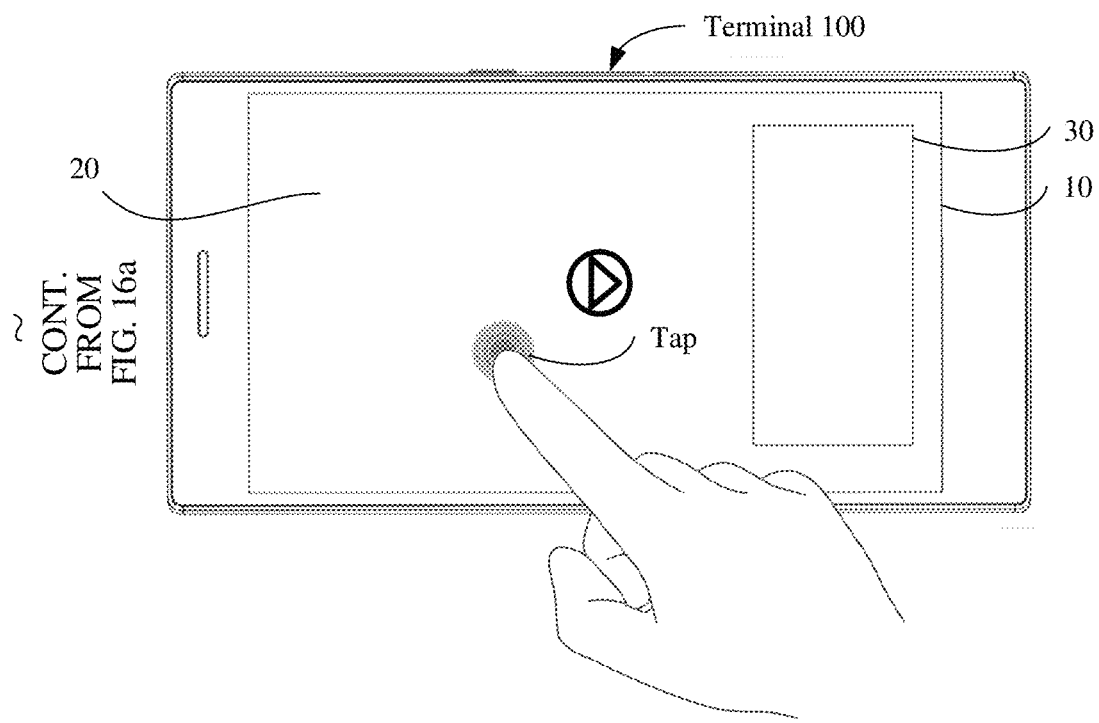

In addition to the manners of hiding the small window 30 shown in FIG. 5, FIG. 16*a*, and FIG. 16*b*, in some embodiments of this application, the small window 30 may also be hidden in another manner. For example, the small window 30 is hidden by tapping a "hidden" option or a minimize icon output by the terminal 100. This is not limited herein.

In some embodiments of this application, the user may further switch between the interface content 20 and the display interface of the small window 30. In this application, an operation used to switch between the interface content 20 and the display interface of the small window 30 may be referred to as a sixth user operation.

Specifically, when content displayed in the small window 30 is more important or the user is more interested in the displayed content, switching may be performed between the interface content 20 and the display interface of the small window 30. For example, when the interface content 20 is an interface on which a video is being played, the small window 30 is the interface of the instant messaging application, and important information (for example, a notification message sent by a boss to an employee) is displayed on the interface, the user may switch between the video interface and the interface of the instant messaging application. After the switching, the display interface of the small window 30 may be displayed in a larger display area, to facilitate viewing by the user.

The following describes several possible switching manners.

Figure 17A:
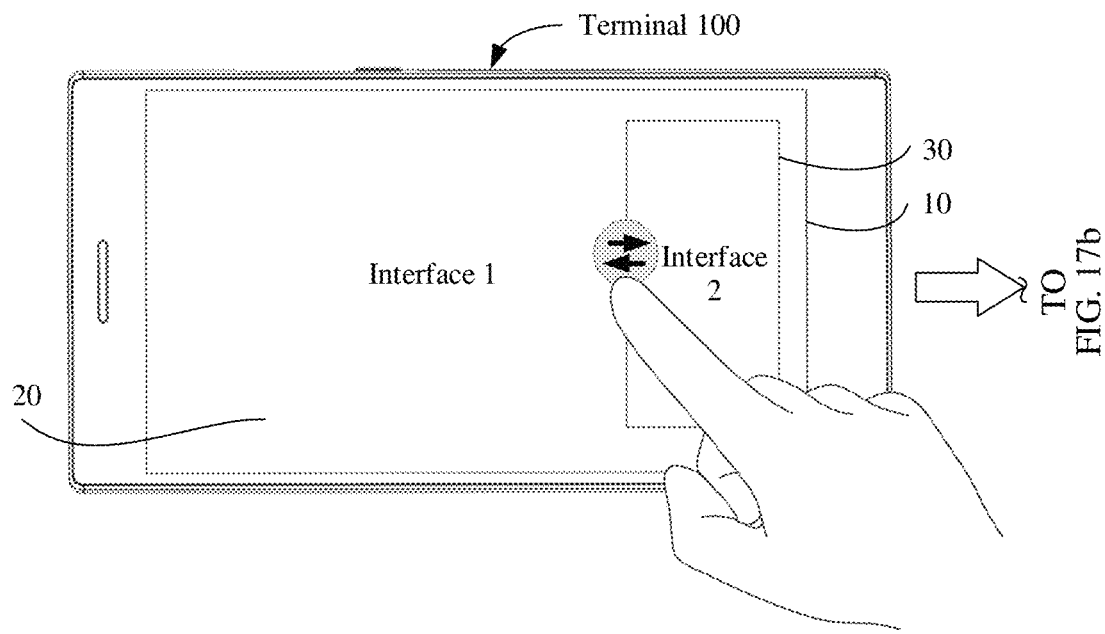

In a possible implementation, the display 10 may display a switching icon or a text option, to prompt the user to switch between the interface content 20 and the display interface of the small window 30. The icon or the text option may be displayed at a boundary between the small window 30 and the interface content 20. For example, as shown in FIG. 17*a*, a switching icon is displayed at a boundary between a left edge of the small window 30 and the interface content 20. The user may tap the switching icon, to switch between the interface content 20 and the display interface of the small window 30.

Figure 18A:
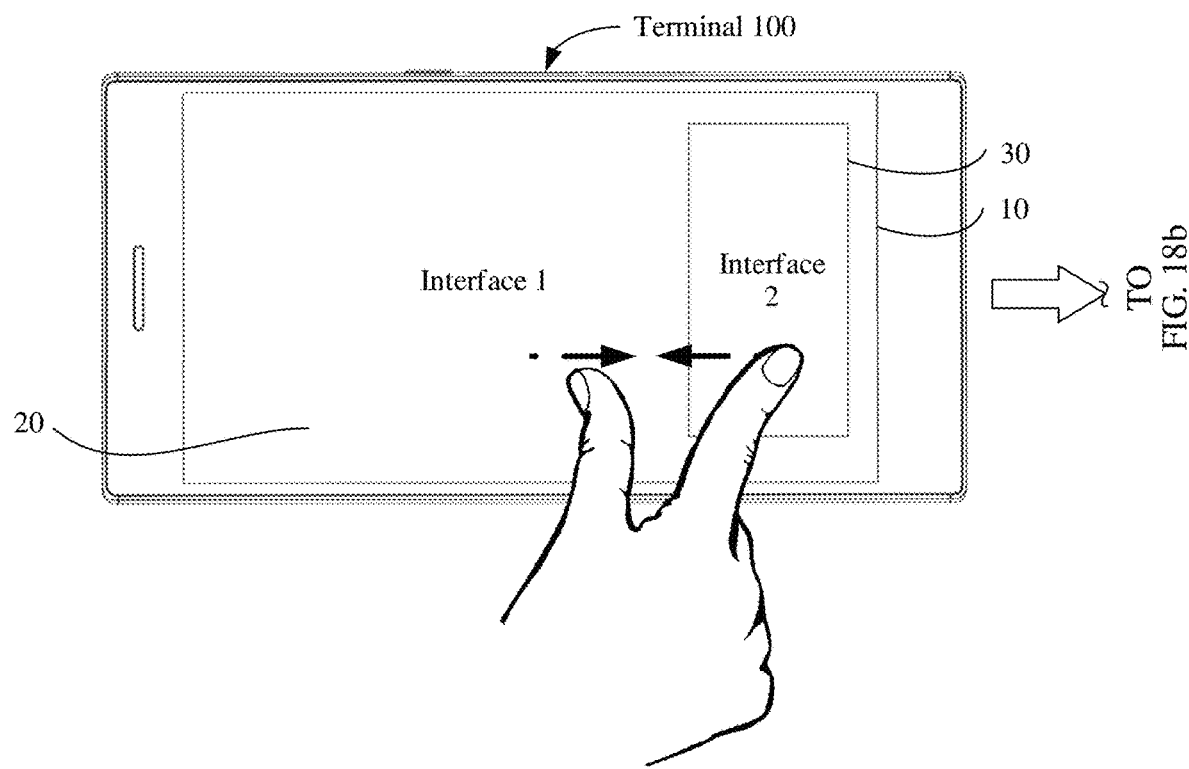
Figure 18B:
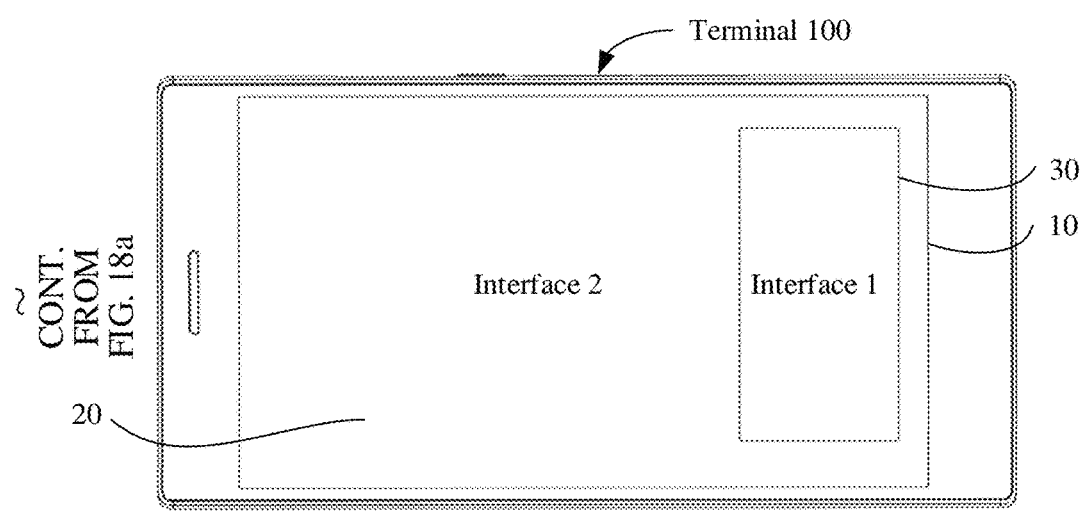

In another possible implementation, as shown in FIG. 18*a* and FIG. 18*b*, the user may use two fingers to touch the display 10. One finger touches any position in the interface content 20, and the other finger touches any position in the small window 30. The user slides the two fingers along a track shown by dashed lines in the figure. When detecting the two-finger slide operation of the user, the terminal 100 may switch between the interface content 20 and the display interface of the small window 30. Herein, the display 10 shown in FIG. 18*a* and FIG. 18*b* may also output the switching icon shown in FIG. 16*a* and FIG. 16*b*, to prompt the user that the display interface may be switched.

Figure 19A:
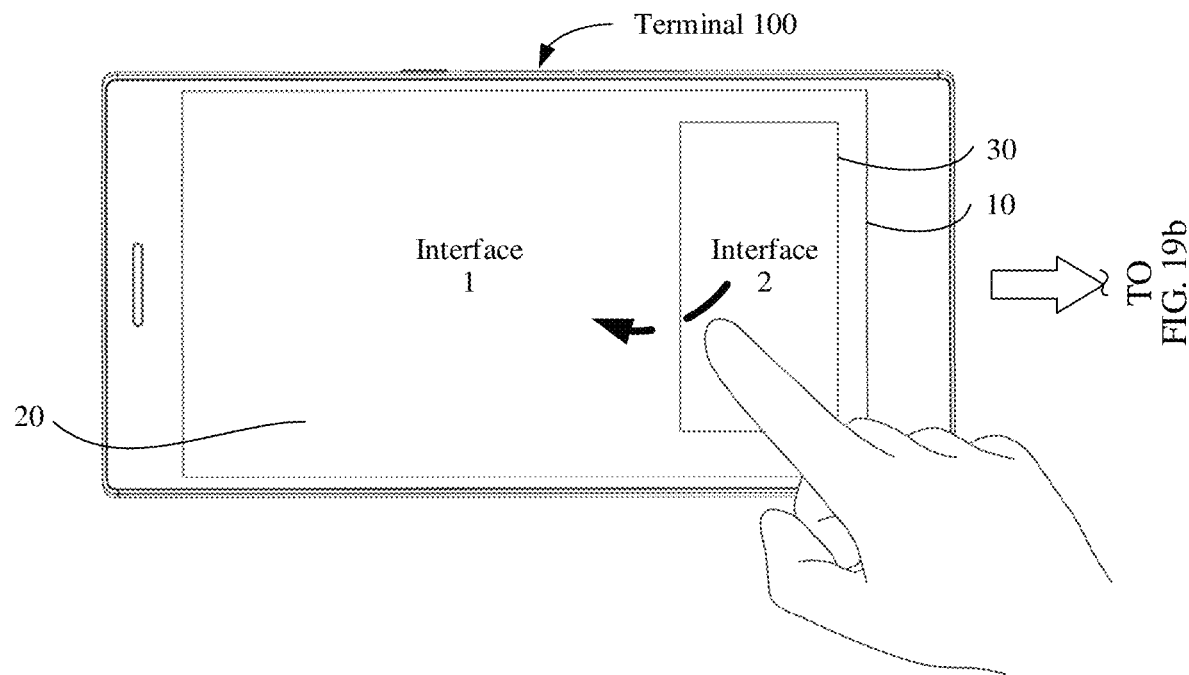
Figure 19B:
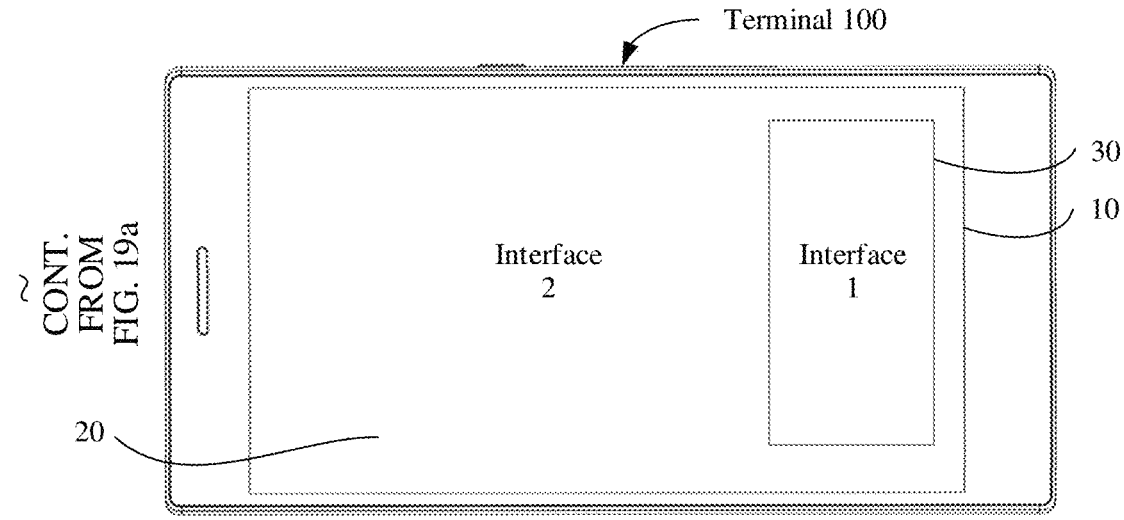

In still another possible implementation, as shown in FIG. 19*a* and FIG. 19*b*, the user may touch any position in the small window 30 by using a single finger, and slide from the small window 30 to the interface content 20 along a track shown by a dashed line in the figure. When detecting the slide operation of the user, the terminal 100 may switch between the interface content 20 and the display interface of the small window 30. Herein, the display 10 shown in FIG. 19*a* and FIG. 19*b* may also output the switching icon shown in FIG. 16*a* and FIG. 16*b*, to prompt the user that the display interface may be switched.

In addition to the foregoing switching manner, in some embodiments of this application, the interface content 20 and the display interface of the small window 30 may alternatively be switched in another manner. For example, the user may further touch any position in the interface content 20 by using a single finger, and slide in a direction from the interface content 20 to the small window 30.

After switching is performed between the interface content 20 and the display interface of the small window 30, the display interface of the small window 30 may be displayed in a larger display area, to facilitate viewing by the user.

Figure 20:
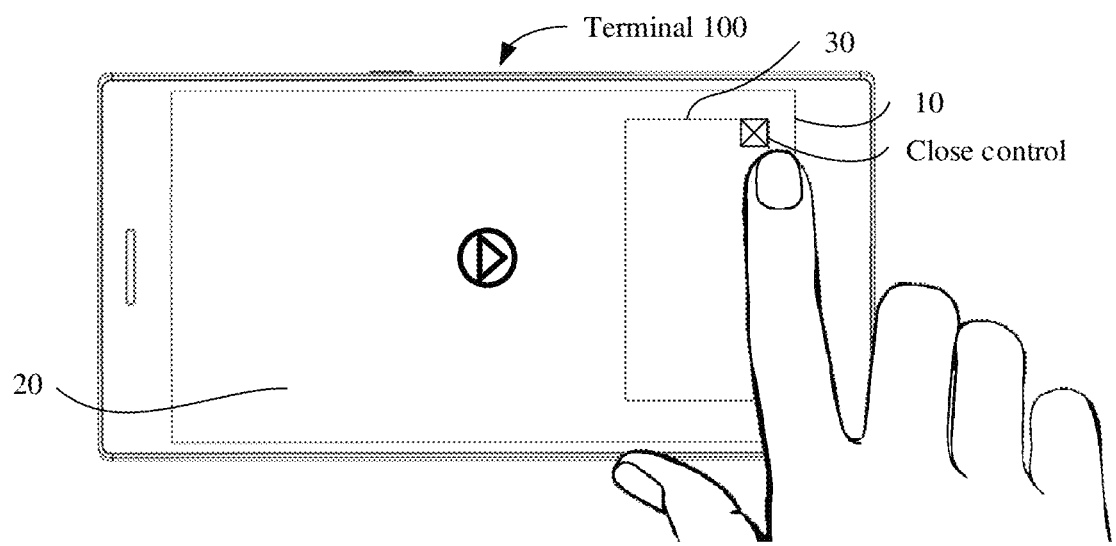

In some embodiments of this application, the user may further close the small window 30. Herein, closing the small window 30 means that a corresponding program that triggers multi-window display is closed, and the display 10 displays only the interface content 20. In a possible implementation, after the small window 30 is closed, a processing resource, a storage resource, and the like that are used by the terminal 100 to display the small window are released. In another possible implementation, after the small window 30 is closed, the small window 30 continues to run in the background of the terminal 100, but is not displayed on the display 10. For example, FIG. 20 shows a possible manner of closing the small window 30. As shown in FIG. 20, an upper right corner of the small window 30 may include a close control 70, and the user may tap the control 70, to trigger the terminal 100 to close the small window 30. In this application, an operation used to switch between the interface content 20 and the display interface of the small window 30 may also be referred to as a third user operation.

When the user does not need to display a plurality of windows, the small window 30 is closed, to reduce running power consumption of the terminal 100.

It may be understood that the examples shown in FIG. 1 to FIG. 20 are merely used to explain the embodiments of the present invention, and should not be construed as a limitation.

The following describes an implementation of the terminal 100 provided in some embodiments of this application.

In some embodiments of this application, the terminal 100 may be a portable electronic device such as a mobile phone, a tablet, a personal digital assistant (PDA), or a wearable device. An example embodiment of a portable electronic device includes but is not limited to a portable electronic device using iOS, Android, Microsoft, or another operating system. The portable electronic device may also be another portable electronic device, for example, a laptop with a touch-sensitive surface (for example, a touch panel). It should be further understood that in some other embodiments of this application, the terminal 100 may alternatively be a desktop computer with a touch-sensitive surface (for example, a touch panel), but not a portable electronic device.

In some embodiments of this application, a display is disposed on the terminal 100, and may be configured to display interface content currently output by a system of the terminal. The interface content may include an interface of a running application, a system-level menu, and the like, and may specifically include the following interface elements: an input interface element, for example, a button, a text input box, a scroll bar, a menu, and the like, and an output interface element, for example, a view window and a label.

In some embodiments of this application, a touch panel is disposed on the display of the terminal 100. In other words, the display is a touchscreen. The touch panel may be configured to receive a touch control operation performed by a user. The touch control operation is an operation that the user directly touches the display by using a body part, a stylus, or the like. In some optional embodiments, the touchscreen may be further configured to receive a floating touch operation performed by the user. The floating touch operation is an operation that a hand of the user is floated above the display and is not in contact with the display.

In some embodiments of this application, when the touchscreen of the terminal 100 receives a user operation used to trigger displaying of a small window, the small window is displayed when the touchscreen displays current interface content. The small window is displayed on the display 10 in a hover box.

Herein, for the user operation used to trigger displaying of the small window, display content of the small window, a display manner, and the like, refer to related descriptions in the foregoing embodiments. Details are not described herein again.

In some optional embodiments of this application, a position, a shape, and a size of the small window may be adjusted. For the adjustment, refer to the embodiment in FIG. 13a to FIG. 13c.

In some optional embodiments of this application, the touchscreen of the terminal 100 may further receive a user operation used to trigger the terminal to hide the small window. Herein, for the user operation used to trigger hiding of the small window, refer to the foregoing embodiments in FIG. 5, FIG. 16a, and FIG. 16b.

In some optional embodiments of this application, the touchscreen of the terminal 100 may further receive a user operation used to trigger the terminal to re-invoke the small window. Herein, for the user operation used to trigger re-invocation of the small window, refer to the foregoing embodiments in FIG. 7 and FIG. 9a to FIG. 9d.

In some embodiments of this application, the touchscreen disposed in the terminal 100 may have a relatively large size (for example, 5 inches or more than 5 inches), and can bring better visual experience to the user, for example, in playing a game or watching a video.

Figure 21:
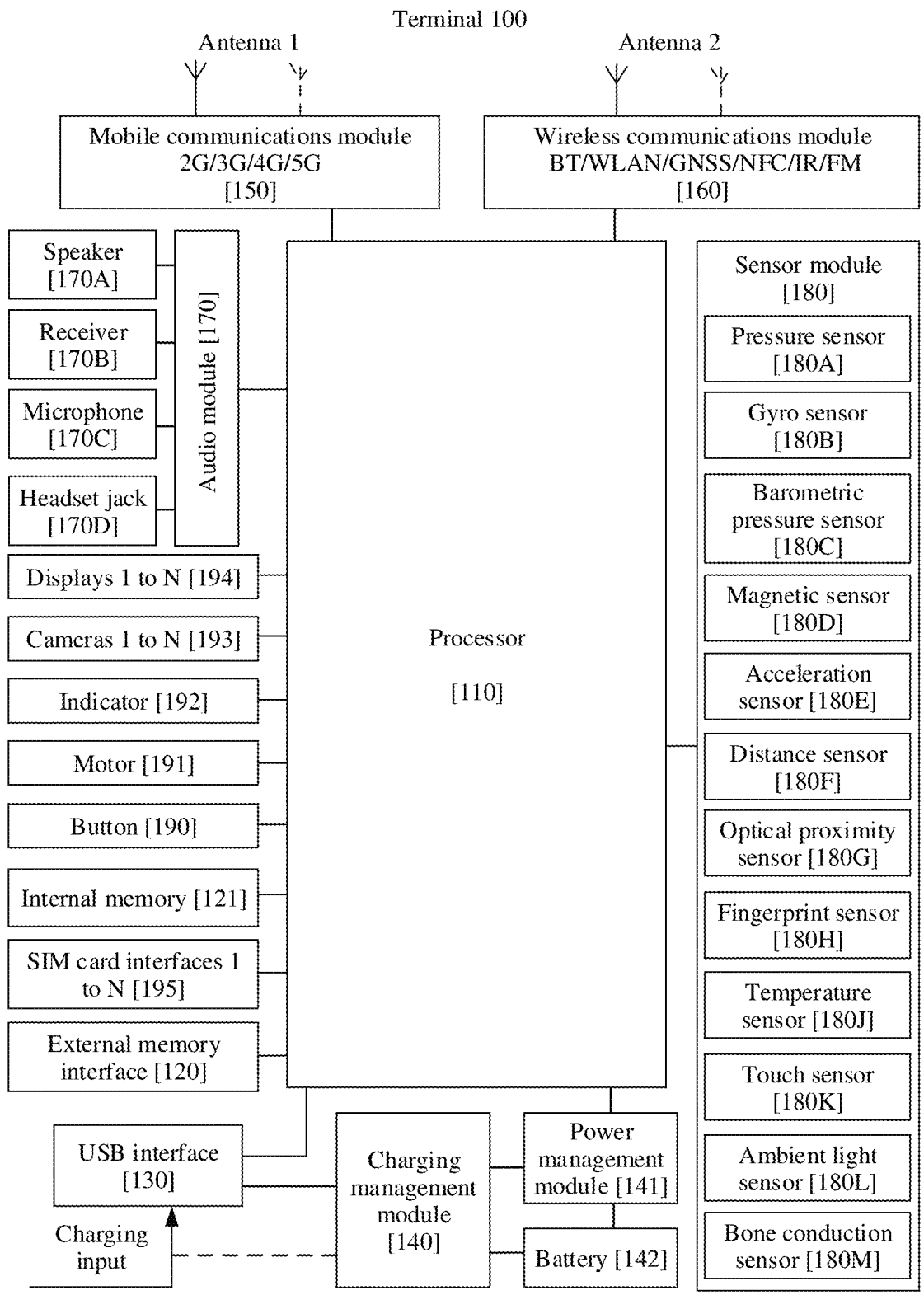
FIG. 21 is a schematic structural diagram of a terminal device according to an embodiment.

FIG. 21 is a structural block diagram of an example implementation of a terminal 100.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in the embodiments of the present invention does not constitute a specific limitation on the terminal 100. In some other embodiments of this application, the terminal 100 may include more or fewer components than those shown in the figure, or combine some components, or divide some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural processing unit (neural-network processing unit, NPU). Different processing units may be independent devices, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache. The memory may store one or more instructions or data that is just used or cyclically used by the processor 110. If the processor 110 needs to use the instruction(s) or the data again, the processor 110 may directly invoke the instruction(s) or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 by using a PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may specifically be a mini USB interface, a micro USB interface, a USB Type C interface, or the like. The USB interface 130 may be configured to connect to the charger to charge the terminal 100, or may be configured to transmit data between the terminal 100 and a peripheral device, or may be configured to connect to a headset to play audio by using the headset. The interface may be further configured to connect to another electronic device such as an AR device.

It may be understood that an interface connection relationship between the modules that is shown in this embodiment of the present invention is merely an example for description, and does not constitute a limitation on a structure of the terminal 100. In some other embodiments, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal 100. The charging management module 140 supplies power to an electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera module 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that is applied to the terminal 100 and that include a wireless local area network (WLAN) (for example, a wireless fidelity (Wi-Fi) network), Bluetooth (BT), a global navigation satellite system (GNSS), frequency modulation (FM), a near field communication (NFC) technology, or an infrared (IR) technology. The wireless communications module 160 may be one or more components integrating at least one communications processor module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the terminal 100 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs, which execute one or more program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a MiniLED, a MicroLED, a micro-oLED, a quantum dot light emitting diode (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further optimize an algorithm for noise, brightness, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge coupled device (CCD) or a complementary metal-oxide-semiconductor (CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the terminal 100 may include one or N cameras 193, where N is a positive integer greater than 1.

The digital signal processor is configured to process a digital signal. In addition to the digital image signal, the digital signal processor may further process another digital signal. For example, when the terminal 100 selects a frequency, the digital signal processor is configured to perform Fourier transform, and the like on frequency energy.

The video codec is configured to compress or decompress a digital video. The terminal 100 may support one or more video codecs. In this way, the terminal 100 can play or record videos in a plurality of coding formats, for example, moving picture experts group (MPEG) 1, MPEG 2, MPEG 3, and MPEG 4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to be connected to an external storage card such as a micro SD card, to extend a storage capability of the terminal 100. The external storage card communicates with the processor 110 by using the external memory interface 120, to implement a data storage function. For example, files such as music and a video are stored in the external memory card.

The internal memory 121 may be configured to store computer executable program code, and the executable program code includes one or more instructions. The processor 110 runs the instruction(s) stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS).

The terminal 100 may implement an audio function through the audio module 170, the speaker 170A, the receiver 170B, the microphone 170C, the headset jack 170D, the application processor, and the like, for example, music playing and recording.

The audio module 170 is configured to convert digital audio information into analog audio signal output, and is also configured to convert analog audio input into a digital audio signal. The audio module 170 may be further configured to: code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The terminal 100 may listen to music by using a speaker 170A, or listen to a hands-free call.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "voice transmitter", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. In some optional embodiments of this application, the pressure sensor 180A may be configured to capture a pressure value generated when a finger part of the user touches the display, and transmit the pressure value to the processor, so that the processor identifies a finger part through which the user enters the user operation.

There are many types of pressure sensors 180A, for example, a resistive pressure sensor, an inductive pressure sensor, and a capacitive pressure sensor. The capacitive pressure sensor may include at least two parallel plates made of a conductive material. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are applied to a same touch position but have different touch operation strength may correspond to different operation instructions. For example, when a touch operation whose touch operation intensity is less than a first pressure threshold is performed on an icon of an SMS message application, an instruction for viewing an SMS message is performed. When a touch operation whose touch operation intensity is greater than or equal to the first pressure threshold is performed on the icon of the SMS message application, an instruction for creating a new SMS message is performed. In some optional embodiments of this application, the pressure sensor 180A may transmit a detected capacitance value to the processor, so that the processor identifies a finger part (a knuckle, a finger pad, or the like) through which the user enters a user operation. In some optional embodiments of this application, the pressure sensor 180A may further calculate a quantity of touch points based on a detected signal, and transmit a calculated value to the processor, so that the processor identifies that the user enters a user operation by using a single finger or a plurality of fingers.

The gyro sensor 180B may be configured to determine a moving posture of the terminal 100. In some embodiments, angular velocities of the terminal 100 around three axes (namely, x, y, and z axes) may be determined by using the gyro sensor 180B. The gyro sensor 180B may be configured to implement image stabilization during photographing. For example, when the shutter is opened, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may also be used in a navigation scenario and a somatic game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect values of accelerations in various directions (usually on three axes) of the terminal 100. When the terminal 100 is still, a value and a direction of gravity may be detected. The acceleration sensor 180E may be further configured to identify a posture of the electronic device, and is applied to an application such as switching between landscape orientation and portrait orientation or a pedometer. In some optional embodiments of this application, the acceleration sensor 180E may be configured to: capture an acceleration value generated when a finger part of the user touches the display, and transmit the acceleration value to the processor, so that the processor identifies a finger part through which the user enters the user operation.

The distance sensor 180F is configured to measure a distance. The terminal 100 may measure a distance through infrared light or a laser. In some embodiments, in a photographing scenario, the terminal 100 may use the distance sensor 180F to measure a distance, to implement fast focusing.

The optical proximity sensor 180G may include, for example, a light emitting diode (LED) and an optical detector such as a photodiode. The light emitting diode may be an infrared light emitting diode. The terminal 100 emits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the user holds the terminal 100 close to an ear to make a call, to automatically turn off the display for power saving. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transmit the detected touch operation to the application processor to determine a type of the touch event. A visual output related to the touch operation may be provided by using the display 194. In some other embodiments, the touch sensor 180K may also be disposed on a surface of the terminal 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive key input, and generate key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may further be compatible with an external storage card. The terminal 100 interacts with a network via a SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with the layered architecture is used as an example to illustrate a software structure of the terminal 100.

Figure 22:
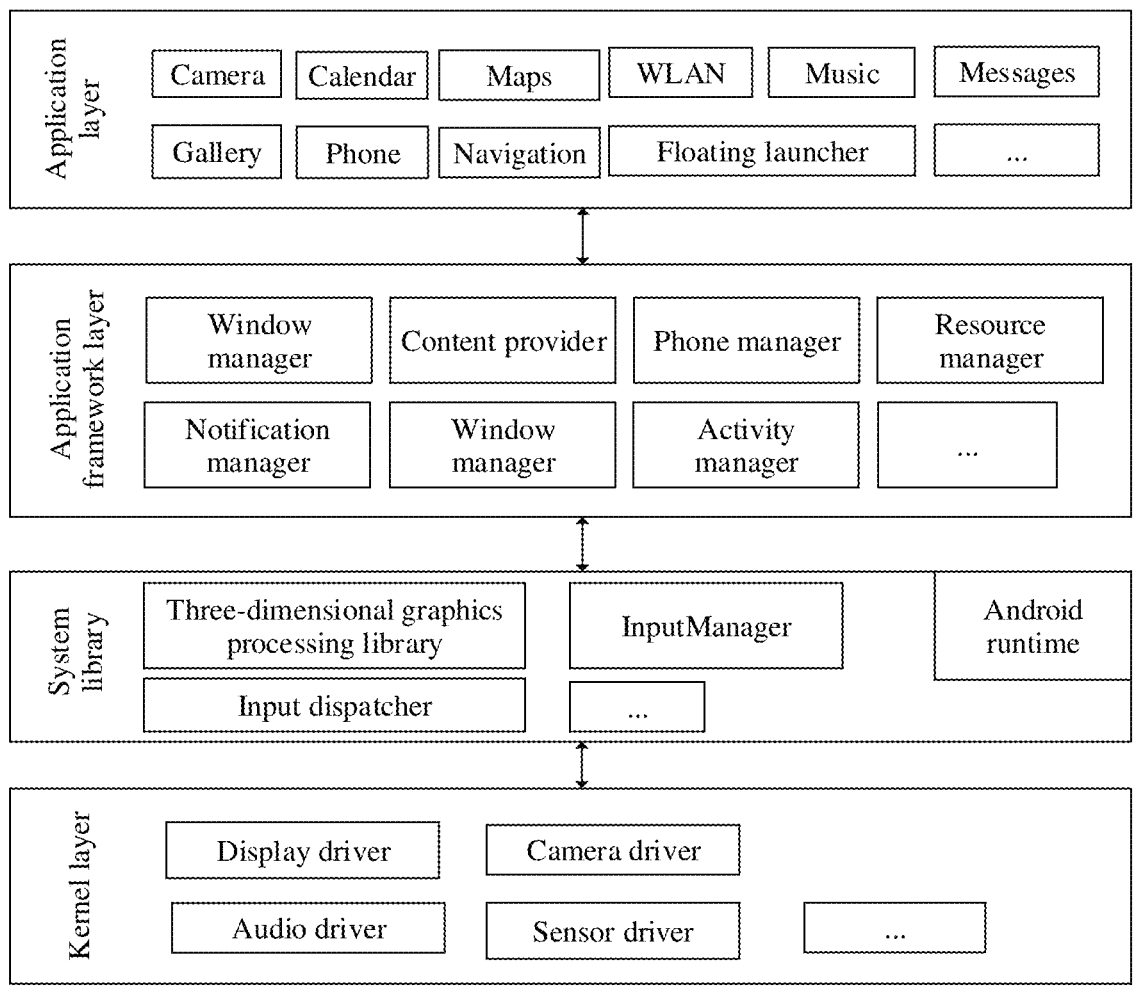
FIG. 22 is a structural block diagram of software of a terminal according to an embodiment.

FIG. 22 is a structural block diagram of software of a terminal 100 according to an embodiment of the present invention.

In the layered architecture, software is divided into several layers, and each layer has a clear role and task. The layers communicate with each other through a software interface. In some embodiments, an Android system is divided into four layers, namely, an application layer, an application framework layer, an Android runtime and system library, and a kernel layer from top to bottom.

The application layer may include a series of application packages.

As shown in FIG. 22, the application package may include applications such as Camera, Gallery, Calendar, Phone, Maps, Navigation, WLAN, Bluetooth, Music, Videos, and Messages.

In some embodiments of this application, a floating launcher may be further added to the application layer, is used as a default display application in the foregoing small window 30, and is provided for the user to enter another application.

The application framework layer provides an application programming interface (API) and a programming framework for an application at the application layer. The application framework layer includes some predefined functions.

As shown in FIG. 22, the application framework layer may include a window manager, a content provider, a view system, a phone manager, a resource manager, a notification manager, an activity manager, and the like.

The window manager is configured to manage a window program. The window manager may obtain a size of a display, determine whether there is a status bar, perform screen locking, take a screenshot of the display, and the like. In some embodiments of this application, a FloatingWindow may be extended based on a native PhoneWindow of Android, and is specially configured to display the foregoing small window 30, so as to distinguish the small window from a common window. The window has an attribute of being displayed on a top layer of a series of windows in a hover box. In some optional embodiments, a proper value of the window size may be given based on an actual size of a screen according to an optimal display algorithm. In some possible embodiments, an aspect ratio of the window may be an aspect ratio of a screen of a conventional mainstream mobile phone by default. In addition, to help the user close and hide the small window, an extra close button and a minimize button may be drawn in an upper right corner. In addition, in a window management module, some gesture operations of the user are received. If a gesture operation conforms to an operation gesture of the foregoing small window, the window is frozen, and an animation effect of moving the small window is played.

The content provider is configured to: store and obtain data, and make the data accessible to an application. The data may include a video, an image, audio, calls that are made and answered, a browsing history and a bookmark, a phonebook, and the like.

The view system includes visual controls such as a control for displaying a text and a control for displaying a picture, and the view system may be configured to construct an application. The display interface may include one or more views. For example, a display interface including an SMS message notification icon may include a view for displaying a text and a view for displaying a picture. In some embodiments of this application, a key view used for operations such as closing and minimization may be correspondingly added to the small window, and bound to the FloatingWindow in the window manager.

The phone manager is configured to provide a communication function for the terminal 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification-type message. The notification-type message may automatically disappear after the message is displayed for a short period of time without user interaction. For example, the notification manager is configured to provide a notification of download completion, a message notification, and the like. The notification manager may be a notification that appears in a top status bar of the system in a form of a graph or a scroll bar text, for example, a notification of an application running in the background, or may be a notification that appears on the display in a form of a dialog window. For example, text information is prompted in the status bar, an alert sound is produced, the electronic device vibrates, or the indicator light blinks.

The activity manager is used to manage activities that are running in the system, including processes, applications, services, task information, and the like. In some embodiments of this application, an activity task stack specially used to manage an activity of an application displayed in the small window 30 may be newly added to the activity manager module, to ensure that the activity and a task of the application in the small window do not conflict with an application displayed on the screen in full screen.

In some embodiments of this application, a motion detection component (motion detector) may be further added to the application framework layer, to perform logical determining on an obtained input event and identify a type of the input event. For example, it is determined, based on information such as touch coordinates and a time stamp of a touch operation included in an input event, that the input event is a knuckle touch event, a finger pad touch event, or the like. In addition, the motion detection component may further record a track of the input event, determine a gesture rule of the input event, and respond to different operations based on different gestures.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on a virtual machine. The virtual machine executes a Java file at the application layer and the application framework layer as a binary file. The virtual machine is configured to perform functions such as object lifecycle management, stack management, thread management, security and exception management, and garbage collection.

The system library may include a plurality of function modules, for example, an input manager, an input dispatcher, a surface manager, a media library, a three-dimensional graphics processing library (for example, OpenGL ES), and a 2D graphics engine (for example, SGL).

The input manager is responsible for obtaining event data from an underlying input driver, parsing and encapsulating the event data, and sending the event data to the input dispatcher.

The input dispatcher is configured to store window information. After receiving an input event from the input manager, the input scheduling manager searches for a proper window from windows stored by the input dispatcher, and dispatches the event to the window.

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the terminal 100 by using an example with reference to a photographing capture scenario.

When the touch sensor 180K receives a touch operation, a corresponding hardware interruption is sent to the kernel layer. The kernel layer processes the touch operation into a raw input event (including information such as touch coordinates or a time stamp of the touch operation). The raw input event is stored at the kernel layer. The application framework layer obtains the raw input event from the kernel layer, and identifies a control corresponding to the input event. For example, the touch operation is a touch and single-tap operation, and a control corresponding to the single-tap operation is a control of an icon of a camera application. The camera application invokes an interface at the application framework layer to enable the camera application, then enables a camera driver by invoking the kernel layer, and captures a static image or a video by using the camera 193.

The following describes a working procedure of software and hardware of the terminal 100 by using an example with reference to a method for quickly invoking a small window in some embodiments of this application.

Figure 23A:
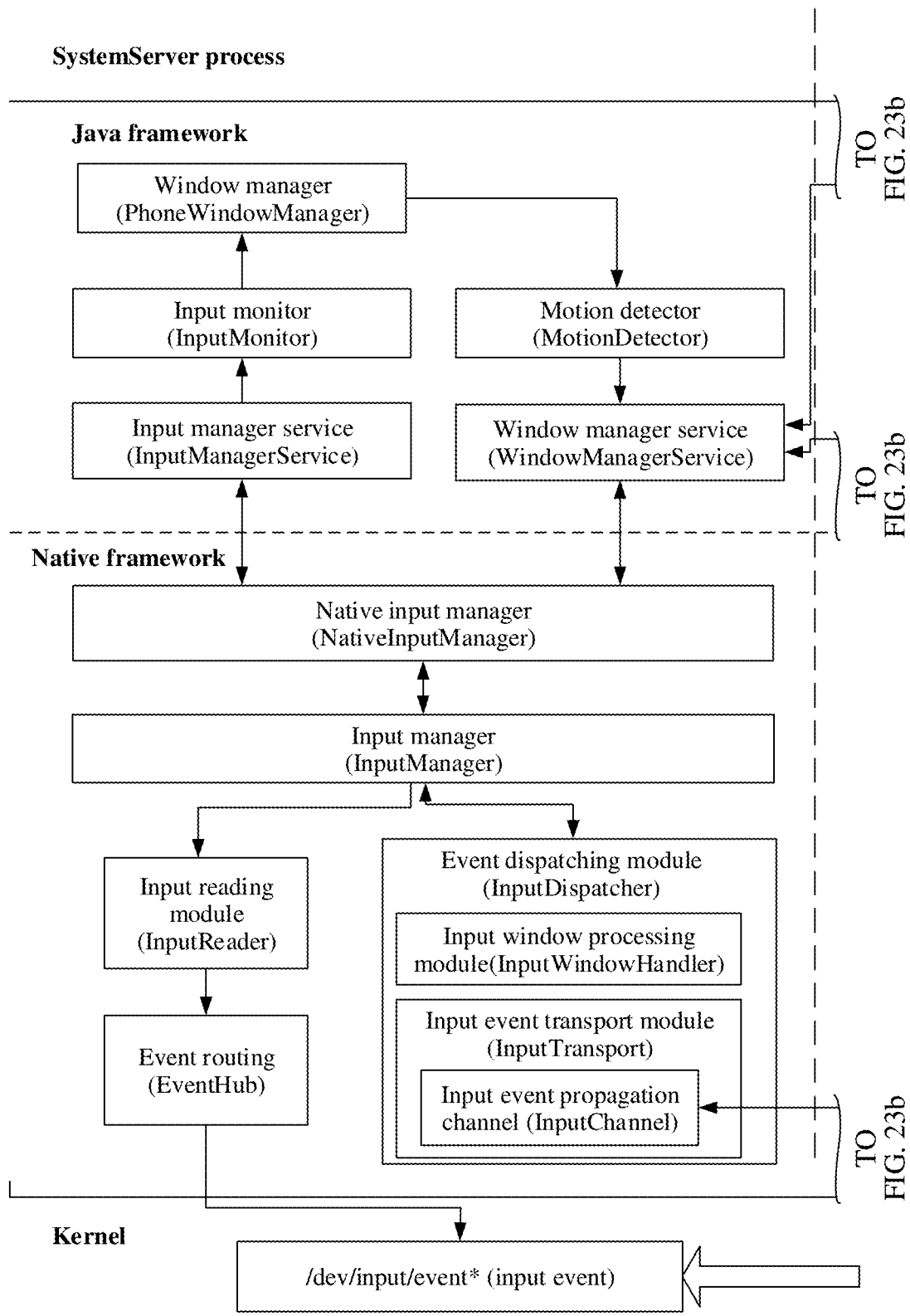
FIG. 23a and FIG. 23b illustrate a schematic diagram of implementing, by using software and hardware of a terminal, a method for quickly invoking a small window when a video is being displayed in full screen according to an embodiment.
Figure 23B:
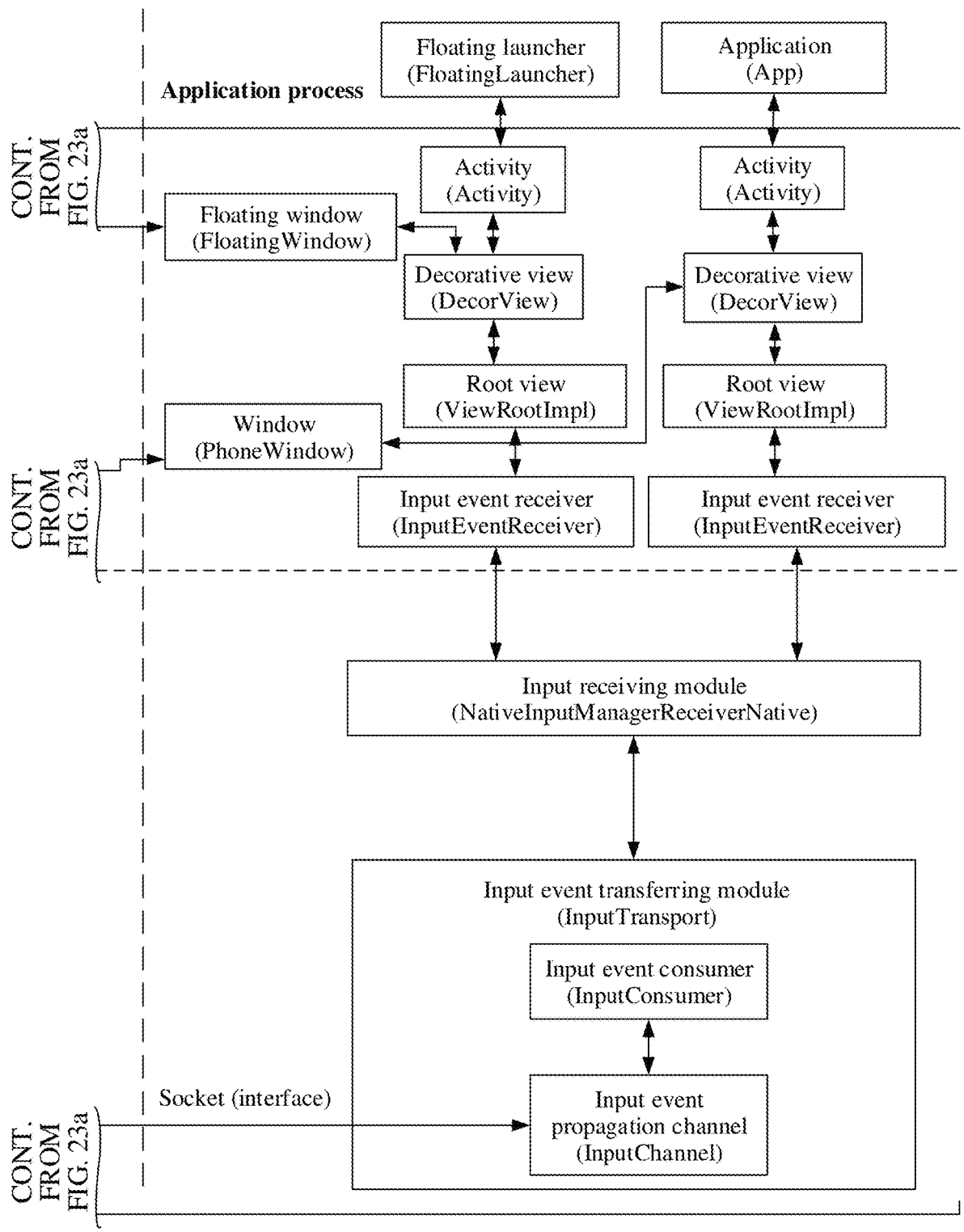

In FIG. 23a and FIG. 23b, a kernel, a Native framework, a JAVA framework, a SystemServer process, and an application process in FIG. 23a and FIG. 23b respectively correspond to a kernel layer, a system library, an application framework layer, and an application layer in FIG. 22.

When the touch sensor 180K receives a touch operation, a corresponding hardware interruption is sent to the kernel layer. The kernel layer processes the touch operation into a raw input event, namely, /dev/input/event* in FIG. 23a and FIG. 23b. The raw input event includes information such as touch coordinates or a time stamp of the touch operation.

The raw input event is stored at the kernel layer. The input manager of the system library obtains an original input event from the kernel layer, parses and encapsulates the event, and sends the event to the input dispatcher. After receiving an input event from the input manager, the input dispatcher dispatches the input event to a proper window.

The motion detection component (motion detector) at the application layer obtains the encapsulated input event from the input manager and performs logical determining on the event. For example, the touch operation received by the touch sensor 180K is that the user draws a rectangle by using a knuckle. The motion detection component may determine, from a display pressure value, a capacitance value, touch coordinates, and the like in the input event, that the input event is drawing a rectangle by using a knuckle.

If a logical determining result conforms to an enabling gesture for enabling a floating window, a floating window enabling component is invoked, to display a small window on interface content currently output on the display.

Based on the embodiments shown in FIG. 1 to FIG. 20 and the terminal 110 in the embodiment in FIG. 21, the following describes a method for quickly invoking a small window provided in some embodiments of this application.

Figure 24:
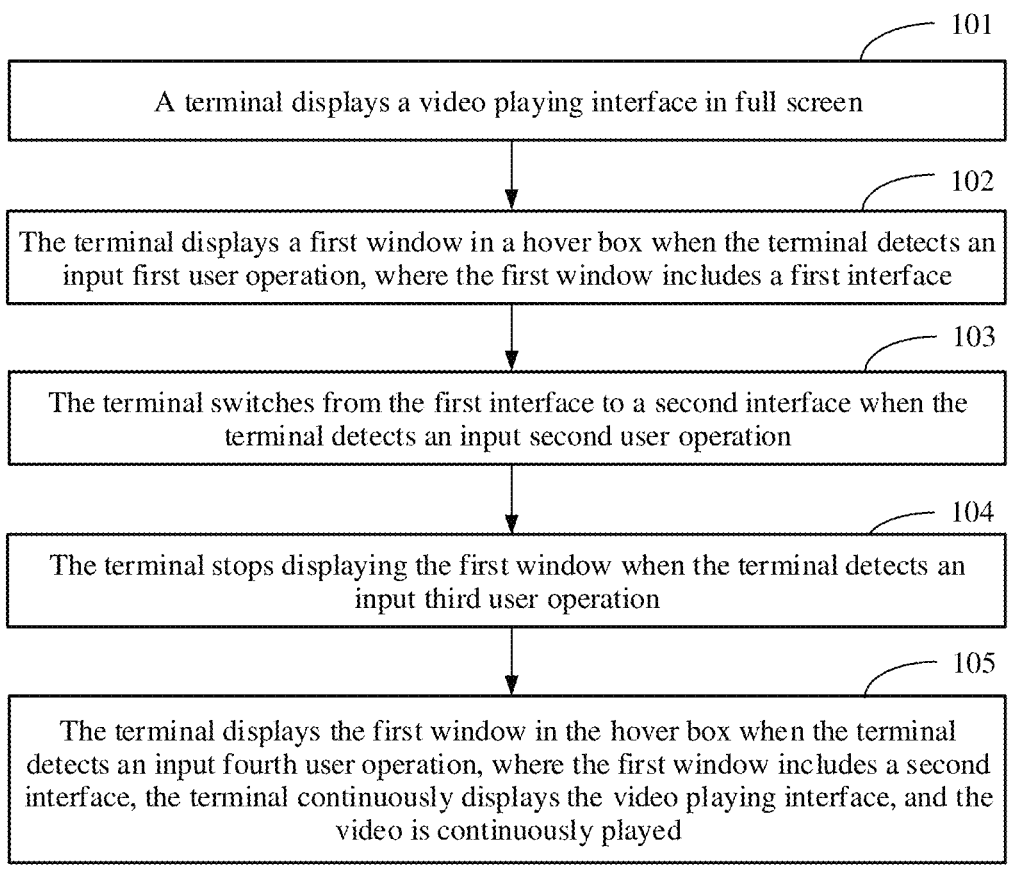
FIG. 24 is a schematic flowchart of a method for quickly invoking a small window when a video is being displayed in full screen according to an embodiment.

FIG. 24 is a schematic flowchart of a method for quickly invoking a small window when a video is displayed in full screen according to an embodiment of this application. As shown in FIG. 24, the method includes the following steps.

S101: A terminal displays a video playing interface in full screen.

Specifically, referring to the foregoing embodiment in FIG. 1, an operation of triggering the terminal to display the video playing interface in full screen may include an operation performed by the user on a video interface (for example, tapping a maximize button, or changing a posture of the terminal from portrait orientation to landscape orientation), and the like.

In some embodiments of this application, that the terminal displays the video playing interface in full screen may be: A display of the terminal displays only the video interface shown in the right portion of FIG. 1, and does not display other content. In a possible implementation, when displaying the video playing interface in full screen, the video playing interface may occupy an entire display area of the display. In another possible implementation, the video playing interface may alternatively occupy only a part of a display area of the display. For example, when the display is a notch screen, the video playing interface is displayed in the middle of the notch screen. When a black screen is displayed on an edge on one side or edges on two sides of the notch screen, it may also be considered that the display displays the video playing interface in full screen.

In some embodiments of this application, that the terminal displays the video playing interface in full screen may further mean that when displaying the video playing interface, the display may further display a system-level interface element, for example, a status bar or a floating shortcut menu (for example, Assistive Touch of Apple).

In some possible implementations, the video playing interface may not only include a video picture, but also include a progress bar of the video, a virtual button for adjusting volume, a virtual button for playing/pausing a video, and the like.

S102: The terminal displays a first window in a hover box when the terminal detects an input first user operation, where the first window includes a first interface.

In some embodiments of this application, the first user operation may be a gesture made on the display of the terminal, or may be a voice instruction, an eyeball rotation operation, or the like.

It may be learned from the embodiment in FIG. 2 that the first user operation may be a gesture of sliding a knuckle of a user on the display of the terminal to draw a first graph. Herein, the first graph may be a rectangle, a triangle, a square, a circle, or the like. The first graph drawn by the user on the display by using the knuckle may not be a standard shape in a geometric sense, but only needs to be similar to the standard shape.

It may be learned from FIG. 11c in the embodiment in FIG. 11a to FIG. 11d that the first user operation may further be a tap operation of a finger of the user on the display of the terminal. The tap operation may be performed by using one or more knuckles, finger pads, fingertips, styluses, or the like. Further, a system of the terminal may further determine, with reference to a frequency of the tap operation, whether to display the first window. For example, when the system of the terminal detects that the user single-taps, double-taps, or triple-taps the display, the terminal displays the first window. Further, the system of the terminal may further determine, with reference to an area in which the tap operation is performed, whether to trigger the terminal to display the first window. For example, when the system of the terminal detects that the user performs the tap operation in a preset area on the display, the terminal displays the first window.

Referring to FIG. 11d in the embodiment in FIG. 11a to FIG. 11d, the first user operation may be that the finger of the user is in a first floating posture above the display. The first floating posture may mean that a finger floated above the display is in a straight state, a bent state, or the like.

In some embodiments, the first user operation is not limited to a default setting of the terminal at delivery, or may be set by the user. Specifically, the user may select, from a setting menu that includes a plurality of user operations, a user operation as the first user operation, or the user may customize the first user operation based on a habit of the user.

Referring to the embodiment in FIG. 3, the terminal displays the first window in the hover box when detecting the first user operation. In a possible implementation of this application, displaying the first window in the hover box may be: simultaneously displaying the video playing interface and the first window on the display of the terminal, where the first window is stacked on the video playing interface. Herein, when the display displays the video playing interface and the first window in a stacked manner, the first window may be transparent. In other words, the user may see some content on the video playing interface in an area of the first window. The first window may alternatively be opaque. To be specific, the user cannot see content on the video playing interface in the area of the first window. This is not limited herein. In another possible implementation, displaying the first window in the hover box means that when the terminal displays the video playing interface, an area in which the first window is located is not used to display the video playing interface, but is used to display the first window.

Herein, a shape, a position, and a size of the first window may be set by the system of the terminal by default, or may be set by the user based on a use habit of the user, or may be determined in real time based on a user operation. That the shape, the position, and the size of the first window are determined based on the user operation means that the shape, the position, and the size of the first window are related to the first user operation. For example, referring to FIG. 2, when the user slides the knuckle to draw a rectangle to trigger displaying of the first window, the first window may be a rectangle, and a position of the first window may be centered at an area in which the knuckle of the user touches the display.

In some embodiments of this application, the terminal displays the first window in the hover box when the terminal detects the input first user operation. The first window includes a first interface. In other words, the first window displays the first interface. It may be learned from the embodiments in FIG. 3, FIG. 14a, FIG. 14b, FIG. 15a, and FIG. 15b that the first interface may include any one of: (1) an icon of an application; (2) a thumbnail of an application; or (3) an interface of an instant messaging application. Herein, for specific content displayed on the first interface, refer to the foregoing related descriptions. Details are not described herein again.

S103: The terminal switches from the first interface to a second interface when the terminal detects an input second user operation.

In some embodiments of this application, the first interface of the first window may be used to receive a user operation, and the second user operation may be a gesture performed on the first interface. In response to the input second user operation, switching from the first interface of the first window to the second interface is performed. Herein, the first interface and the second interface may be the same, or may be different. This is not limited in embodiments of this application.

Referring to the embodiments in FIG. 3 and FIG. 4, when the first interface includes the icon of the application, the second user operation may be a tap operation performed by the user on the icon of the application, and the second interface may be the interface of the instant messaging application.

Referring to the embodiment in FIG. 14a and FIG. 14b, when the first interface includes the thumbnail of the application, the second user operation may further be a tap operation performed by the user on the thumbnail of the application, and the second interface may be the interface of the instant messaging application.

Referring to the embodiment in FIG. 15a and FIG. 15b, when the first interface includes the interface of the instant messaging application, the second user operation may further be a tap operation performed on an option or a control included on the interface of the instant messaging application, and the second interface may be another interface of the instant messaging application.

S104: The terminal stops displaying the first window when the terminal detects an input third user operation.

In some embodiments of this application, the third user operation may be a gesture made on the display of the terminal, or may be a voice instruction, an eyeball rotation operation, or the like.

Referring to the embodiment in FIG. 5, the third user operation may be a gesture of sliding two fingers of the user from the first window to an edging area of the display.

Referring to the embodiment in FIG. 16a and FIG. 16b, the third user operation may alternatively be that a gesture that the user uses two fingers to separately touch different positions in the first window and slide inwards and towards a central area of the first window; or may be a tap operation performed on the video playing interface, to be specific, the user transfers, from the first window to the video playing interface, a focus at which the user touches the display by using a finger.

Referring to the embodiment in FIG. 20, the third user operation may alternatively be a tap operation performed by the user on the close control 70 in the first window.

In some embodiments of this application, stopping displaying the first window means that a corresponding program that triggers multi-window display is disabled, and the display of the terminal displays only the video playing interface. Stopping displaying the first window may include the following two cases: hiding the first window, and closing the first window. The hidden first window may continue to run in the background of the terminal. After the first window is closed, a processing resource, a storage resource, and the like that are used by the terminal to display the small window may be released.

In a possible implementation, after stopping displaying the first window, the terminal displays a prompt identifier of the first window. The prompt identifier may be a graphic identifier (for example, a prompt bar, a small window icon, or an arrow), a text, or the like. Referring to the embodiment in FIG. 6a and FIG. 6b, the prompt identifier may be the prompt bar 50 or the floating window 60.

Optionally, after the first window is hidden, if the display interface of the first window running in the background is updated, the terminal may further prompt the user with a fact that the display interface of the first window is updated. Herein, the terminal may prompt the user in a plurality of manners. For example, the terminal displays, on the display in a shaking manner or in a highlighted manner, the prompt bar 50 shown in FIG. 6a or the circular floating window 60 shown in FIG. 6b.

S105: The terminal displays the first window in the hover box when the terminal detects an input fourth user operation, where the first window includes a second interface, the terminal continuously displays the video playing interface, and the video is continuously played.

In some embodiments of this application, the fourth user operation may be a gesture made on the display of the terminal, or may be a voice instruction, an eyeball rotation operation, or the like.

It may be learned from the embodiment in FIG. 7 that the fourth user operation may be a gesture of sliding two fingers of the user from an edging area of the display to a middle area. Further, the terminal may further determine, with reference to a detected speed of sliding the two fingers of the user and a detected track length, whether to display the first window. References may be made to the embodiment in FIG. 7. Details are not described herein.

Herein, when detecting an input fourth user operation, the terminal displays the first window in the hover box. Content displayed in the first window is the same as that displayed when displaying the first window is stopped in step S104. In other words, the first window includes the second interface.

Herein, a position of the first window on the display may be the same as that displayed when displaying of the first window is stopped in step S104, or may be related to the fourth user operation. This is not limited herein.

In some embodiments, after detecting the input fourth user operation, the terminal may further detect whether an application having the first window is running. When detecting that the application having the first window is running, the terminal re-displays the first window in the hover box in response to the fourth user operation.

In some embodiments, the method in FIG. 24 may further include: when detecting an input fifth user operation, adjusting, by the terminal, a display status of the first window based on the fifth user operation, where the display status of the first window includes at least one of: a position, a size, or a shape. Herein, for the fifth user operation, refer to related descriptions in the embodiment in FIG. 13a to FIG. 13c.

In some embodiments, the method in FIG. 24 may further include: switching, by the terminal, the video playing interface and a display interface of the first window when detecting an input sixth user operation.

Figure 17B:
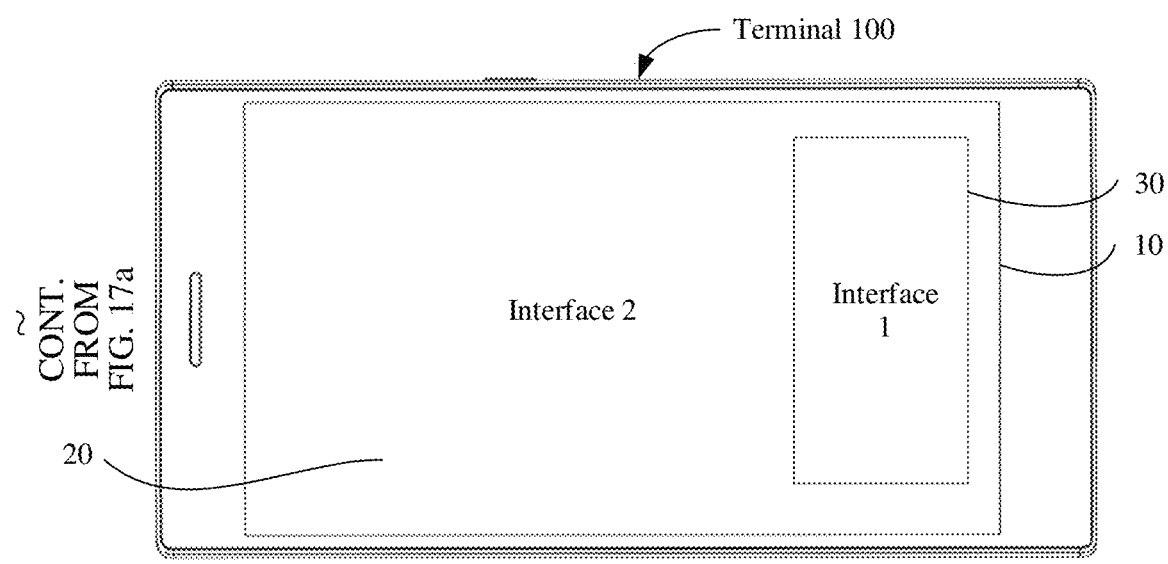

It may be learned from the embodiment in FIG. 17a and FIG. 17b that the terminal may display a switching icon, and the sixth user operation may be a tap operation performed on the switching icon.

It may be learned from the embodiment in FIG. 18a and FIG. 18b that the sixth user operation may alternatively be a gesture in which the user uses two fingers to separately touch the first window and the video playing interface and slide towards a middle area.

It may be learned from the embodiment in FIG. 19a and FIG. 19b that the sixth user operation may alternatively be a gesture in which the user uses a single finger to touch any position in the first window and slide from the first window to the video playing interface.

In the foregoing steps S101 to S105, the terminal continuously displays the video playing interface, and the video is continuously played. In other words, in some embodiments of this application, the small window may be displayed when the video is continuously played. In addition, in some embodiments of this application, displaying of the small window may be further stopped or the small window may further be re-invoked through a user operation, to perform quick switching between multi-window display and full-screen display.

It may be understood that for specific implementations of the steps of the method in FIG. 24, refer to the foregoing embodiments in FIG. 1 to FIG. 20. Details are not described herein again.

Various implementations of this application may be randomly combined to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general purpose computer, a dedicated computer, a computer network, or other programmable apparatuses. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

In summary, the foregoing descriptions are only embodiments of the technical solutions of the present invention, but are not intended to limit the protection scope of the present invention. Any modification, equivalent replacement, and improvement made according to the disclosure of the present invention shall fall within the protection scope of the present invention.

What is claimed is:

1. A method, implemented by a terminal, comprising:
displaying a video playing interface of a video in full screen; and
while the video is being continuously played in full screen:
in response to receiving a first new message and detecting a first user operation on the first new message, displaying a first window in a first position within the video playing interface, wherein the first window comprises a first interface that includes any one of: an icon of a first application, a thumbnail of an application, or an interface of a messaging application corresponding to the first new message, and the first window is a floating window;
in response to detecting a second user operation on the first interface, switching from the first interface of the first window to a second interface within the first window;
in response to detecting a third user operation, moving the first window in the first position to a second position within the video playing interface;
in response to detecting a fourth user operation, stopping displaying of the first window to hide the first window from the video playing interface of the video, and displaying a prompt identifier for the hidden first window on edge on one side of the video playing interface, wherein the prompt identifier is a graphic identifier; and
in response to detecting a fifth user operation, displaying the first window in the second position and stopping displaying the prompt identifier of the first window.

2. The method according to claim 1, wherein the fifth user operation is performed on the prompt identifier when the first window is not being displayed.

3. The method according to claim 1, wherein the first user operation comprises a gesture of sliding an edging area of a display of the terminal.

4. The method according to claim 1, further comprising:
while the video is being played in full screen,
displaying a switching icon, and
displaying the video in the first window and displaying an interface of the first application in full screen upon detecting a sixth user operation performed on the switching icon.

5. The method according to claim 1, further comprising:
while the video is being played in full screen, upon detecting a seventh user operation, adjusting, a display status of the first window based on the seventh user operation, wherein the display status of the first window comprises at least one of: a position, a size, or a shape.

6. The method according to claim 1, further comprising:
while the video is being played in full screen and the first window is hidden, changing a display status of the displayed prompt identifier of the first window when information in an interface of the hidden first window is updated, wherein the first application is an instant messaging application, and the information in the interface of the hidden first window being updated comprises:
the interface being changed to include information indicating that a second new message is received in the instant messaging application.

7. The method according to claim 1, further comprising:
while displaying the prompt identifier of the first window, displaying another prompt identifier of a second window, wherein the other prompt identifier indicating the second window is hidden.

8. The method according to claim 7, further comprising:
displaying an inquiry interface upon detecting a seventh user operation, wherein the inquiry interface comprises a first option for displaying the first window and a second option for displaying the second window; and
displaying the first window upon detecting the first option is selected, or displaying the second window upon detecting the second option is selected.

9. The method according to claim 1, wherein the prompt identifier comprise a prompt bar, an icon or an arrow.

10. A terminal, comprising:
at least one processor; and
a memory coupled to the at least one processor, wherein the memory comprises instructions that, when executed by the at least one processor, cause the terminal to perform operations comprising:
displaying a video playing interface of a video in full screen;
while the video is being continuously played:
displaying a prompt identifier of a first window in full screen;
in response to receiving a first new message and detecting a first user operation on the first new message, displaying a first window in a first position within the video playing interface, wherein the first window comprises a first interface that includes any one of: an icon of a first application, a thumbnail of an application, or an interface of a messaging application corresponding to the first new message, and the first window is a floating window;
in response to detecting a second user operation on the first interface, switching from the first interface of the first window to a second interface within the first window;
in response to detecting a third user operation, moving the first window in the first position to a second position within the video playing interface;
in response to detecting a fourth user operation, stopping displaying of the first window to hide the first window from the video playing interface of the video, and displaying a prompt identifier for the hidden first window on edge on one side of the video playing interface, wherein the prompt identifier is a graphic identifier; and
in response to detecting a fifth user operation, displaying the first window in the second position and stopping displaying the prompt identifier of the first window.

11. The terminal according to claim 10, wherein the fifth user operation is performed on the prompt identifier when the first window is not being displayed.

12. The terminal according to claim 10, wherein the first user operation comprises a gesture of sliding an edging area of a display of the terminal.

13. The terminal according to claim 10, wherein the operations further comprise:
  while the video is being played in full screen, displaying a switching icon, and displaying the video in the first window and displaying an interface of the first application in full screen upon detecting a sixth user operation performed on the switching icon.

14. The terminal according to claim 10, wherein the operations further comprise:
  while the video is being played in full screen, upon detecting a seventh user operation, adjusting, a display status of the first window based on the seventh user operation, wherein the display status of the first window comprises at least one of: a position, a size, or a shape.

15. The terminal according to claim 10, wherein the operations further comprise:
  while the video is being played in full screen and the first window is hidden, changing a display status of the displayed prompt identifier of the first window when information in an interface of the hidden first window is updated, wherein the first application is an instant messaging application, and the information in the interface of the hidden first window being updated comprises:
  the interface being changed to include information indicating that a second new message is received in the instant messaging application.

16. The terminal according to claim 10, wherein the operations further comprise:
  while displaying the prompt identifier of the first window, displaying another prompt identifier of a second window, wherein the other prompt identifier indicating the second window is hidden.

17. The terminal according to claim 16, wherein the operations further comprise:
  displaying an inquiry interface upon detecting a eighth user operation, wherein the inquiry interface comprises a first option for displaying the first window and a second option for displaying the second window; and
  displaying the first window upon detecting the first option is selected, or displaying the second window upon detecting the second option is selected.

18. A non-transitory computer-readable medium storing instructions that, when executed by at least one processor, cause the at least one processor to perform operations comprising:
  displaying a video playing interface of a video in full screen;
  while the video is being continuously played in full screen:
  in response to receiving a first new message and detecting a first user operation on the first new message, displaying a first window in a first position within the video playing interface, wherein the first window comprises a first interface that includes any one of: an icon of a first application, a thumbnail of an application, or an interface of a messaging application corresponding to the first new message, and the first window is a floating window;
  in response to detecting a second user operation on the first interface, switching from the first interface of the first window to a second interface within the first window;
  in response to detecting a third user operation, moving the first window in the first position to a second position within the video playing interface;
  in response to detecting a fourth user operation, stopping displaying of the first window to hide the first window from the video playing interface of the video, and displaying a prompt identifier for the hidden first window on edge on one side of the video playing interface, wherein the prompt identifier is a graphic identifier; and
  in response to detecting a fifth user operation, displaying the first window in the second position and stopping displaying the prompt identifier of the first window.

19. The non-transitory computer-readable medium according to claim 18, wherein the fifth user operation is performed on the prompt identifier when the first window is not being displayed.

20. The non-transitory computer-readable medium according to claim 18, wherein the instructions, when executed by the at least one processor, further cause the at least one processor to perform operations comprising:
  while the video is being played in full screen, displaying a switching icon, and displaying the video in the first window and displaying an interface of the first application in full screen upon detecting a sixth user operation performed on the switching icon.

21. The non-transitory computer-readable medium according to claim 18, wherein the instructions, when executed by the at least one processor, further cause the at least one processor to perform operations comprising:
  while the video is being played in full screen and the first window is hidden, changing a display status of the displayed prompt identifier of the first window when information in an interface of the hidden first window is updated, wherein the first application is an instant messaging application, and the information in the interface of the hidden first window being updated comprises:
  the interface being changed to include information indicating that a second new message is received in the instant messaging application.

* * * * *

UNITED STATES PATENT AND TRADEMARK OFFICE
CERTIFICATE OF CORRECTION

| | | |
|---|---|---|
| PATENT NO. | : 11,599,254 B2 | Page 1 of 1 |
| APPLICATION NO. | : 17/274885 | |
| DATED | : March 7, 2023 | |
| INVENTOR(S) | : Liang Zhou | |

It is certified that error appears in the above-identified patent and that said Letters Patent is hereby corrected as shown below:

On the Title Page

Under OTHER PUBLICATIONS: Change "Publihsed" to --Published--; and

In the Specification

Column 18, Line 67, change "morn's" to --mom's--.

Signed and Sealed this
Fourth Day of April, 2023

*Katherine Kelly Vidal*

Katherine Kelly Vidal
*Director of the United States Patent and Trademark Office*